(12) United States Patent
Lee

(10) Patent No.: US 9,916,544 B2
(45) Date of Patent: Mar. 13, 2018

(54) INFORMATION PROVIDING APPARATUS FOR PROVIDING RESERVATION INFORMATION WITH REDUCED RESPONSE DELAY, INFORMATION PROVIDING METHOD, INFORMATION PROVIDING PROGRAM, AND RECORDING MEDIUM

(75) Inventor: SeungHee Lee, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 884 days.

(21) Appl. No.: 14/129,836

(22) PCT Filed: Feb. 24, 2012

(86) PCT No.: PCT/JP2012/054580
§ 371 (c)(1),
(2), (4) Date: Dec. 27, 2013

(87) PCT Pub. No.: WO2013/001849
PCT Pub. Date: Jan. 3, 2013

(65) Prior Publication Data
US 2014/0136250 A1 May 15, 2014

(30) Foreign Application Priority Data

Jun. 30, 2011 (JP) ................. 2011-146824

(51) Int. Cl.
*G06Q 10/02* (2012.01)
*G06Q 50/14* (2012.01)
*H04L 29/08* (2006.01)

(52) U.S. Cl.
CPC ............. *G06Q 10/02* (2013.01); *G06Q 50/14* (2013.01); *H04L 67/2842* (2013.01)

(58) Field of Classification Search
CPC ..... G06Q 10/02; G06Q 50/14; H04L 67/2842
See application file for complete search history.

(56) References Cited

U.S. PATENT DOCUMENTS 7,062,480 B2 * 6/2006 Fay .................... G06F 17/30902
703/26
7,668,740 B1 * 2/2010 Baggett ............. G06F 17/30457
345/557

(Continued)

FOREIGN PATENT DOCUMENTS

JP 2002-117266 A 4/2002
JP 2003-256702 A 9/2003

(Continued)

OTHER PUBLICATIONS

Davies, et al., 'Caches in the Air': Disseminating Tourist Information in the Guide System, WMCSA '99 Proceedings of the Second IEEE Workshop on Mobile Computer Systems and Applications, Feb. 1999.*

*Primary Examiner* — Daniel Vetter
(74) *Attorney, Agent, or Firm* — Sughrue Mion, PLLC

(57) ABSTRACT

An information providing apparatus caches, based on a number of reservation remains which is periodically acquired from a management apparatus managing numbers of reservation remains of services, a number of remains of a reservation target in a cache means for each reservation target identified by a combination of a service and a time of providing the service; estimates, for each of a plurality of reservation targets corresponding to a request of a user, a probability that information related to a reservation target is browsed by the user; acquires the number of remains of a reservation target where the probability is greater than or equal to a threshold value from the management apparatus and acquires the number of remains of a reservation target where the probability is smaller than the threshold value from the cache means; and provides a state of remains of each of the plurality of reservation targets, the state of remains corresponding to the number of remains.

13 Claims, 13 Drawing Sheets

(56) References Cited

U.S. PATENT DOCUMENTS

| | | | |
|---|---|---|---|
| 2004/0054751 A1 | 3/2004 | Weissert et al. | |
| 2004/0249682 A1* | 12/2004 | DeMarcken | G06F 17/3048 705/5 |
| 2004/0249683 A1* | 12/2004 | Demarcken | G06Q 10/02 705/5 |
| 2008/0167887 A1* | 7/2008 | Marcken | G06Q 10/02 705/5 |
| 2008/0281643 A1* | 11/2008 | Wertheimer | G06Q 10/02 705/5 |
| 2009/0234682 A1* | 9/2009 | Baggett | G06Q 10/02 705/6 |
| 2009/0271226 A1* | 10/2009 | De Marcken | G06Q 10/047 705/5 |
| 2010/0114615 A1* | 5/2010 | Ganguly | G06F 17/3053 705/5 |
| 2010/0198628 A1* | 8/2010 | Rayner | G06Q 10/025 705/6 |
| 2011/0106574 A1* | 5/2011 | Demarcken | G06Q 10/02 705/5 |
| 2013/0024404 A1* | 1/2013 | Zacharia | G06Q 10/02 706/12 |

FOREIGN PATENT DOCUMENTS

| | | | |
|---|---|---|---|
| JP | 2004-527820 A | | 9/2004 |
| JP | 2005092390 A | * | 4/2005 |

* cited by examiner

FIG.2

JULY 3, 2011 – JULY 9    PREVIOUS WEEK    NEXT WEEK

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 7/3 SUN | — | — | — | — | — | × | O | × | × | × | × | × | × | × | × | × | × | × | × | O | O | O | — | — |
| 7/4 MON | — | — | — | — | — | — | × | × | × | × | O | × | × | × | O | × | × | × | O | O | O | O | — | — |
| 7/5 THUS | — | — | — | — | — | — | O | × | O | × | O | × | × | O | O | × | × | O | O | O | × | O | O | — |
| 7/6 WED | — | — | — | — | — | — | O | O | × | × | × | × | O | O | × | O | O | O | O | O | O | O | O | — |
| 7/7 THUR | — | — | — | — | — | — | × | O | × | × | × | × | O | O | × | × | × | O | O | O | × | O | O | — |
| 7/8 FRI | — | — | — | — | — | — | O | O | × | O | × | O | O | O | O | O | × | O | × | × | × | O | O | — |
| 7/9 SAT | — | — | — | — | — | × | × | × | × | × | × | O | × | × | O | × | × | × | × | × | O | O | — | — |

O : VACANT SEATS AVAILABLE    × : FULLY OCCUPIED    — : NO FLIGHT

FIG.4A
MEMBER INFORMATION DB 12a

| |
|---|
| USER ID |
| PASSWORD |
| NICKNAME |
| NAME |
| DATE OF BIRTH |
| GENDER |
| ADDRESS |
| PHONE NUMBER |
| EMAIL ADDRESS |
| . . . |

FIG.4B
AIRLINE TICKET/VACANT SEAT NUMBER INFORMATION DB 12b

| AIRLINE TICKET INFORMATION | |
|---|---|
| | ITEM NUMBER |
| | AIRLINE COMPANY CODE |
| | FLIGHT NUMBER |
| | DEPARTURE PLACE |
| | ARRIVAL PLACE |
| | DEPARTURE AIRPORT |
| | ARRIVAL AIRPORT |
| | DEPARTURE DATE AND TIME |
| | ARRIVAL DATE AND TIME |
| | RESERVATION CLASS |
| | SEAT CLASS |
| | DIRECT FLIGHT / INDIRECT FLIGHT |
| | FARE |
| | . . . |
| NUMBER OF VACANT SEATS | |

FIG.4C
VACANT SEAT NUMBER UPDATE HISTORY DB 12c

| |
|---|
| AIRLINE TICKET INFORMATION |
| UPDATE DATE AND TIME |
| NUMBER OF VACANT SEATS |
| . . . |

FIG.4D
RESERVATION INFORMATION DB 12d

| |
|---|
| RESERVATION NUMBER |
| RESERVATION DATE AND TIME |
| USER ID |
| AIRLINE TICKET INFORMATION |
| NUMBER OF PEOPLE |
| . . . |

FIG.4E
TRANSACTION HISTORY DB 12e

| |
|---|
| RESERVATION NUMBER |
| TRANSACTION DATE AND TIME |
| TRANSACTION TYPE |
| USER ID |
| AIRLINE TICKET INFORMATION |
| NUMBER OF PEOPLE |
| . . . |

FIG.4F
OPERATION HISTORY DB 12f

| |
|---|
| USER ID |
| OPERATION DATE AND TIME |
| SELECTED DAY OF THE WEEK |
| SELECTED TIME PERIOD |
| . . . |

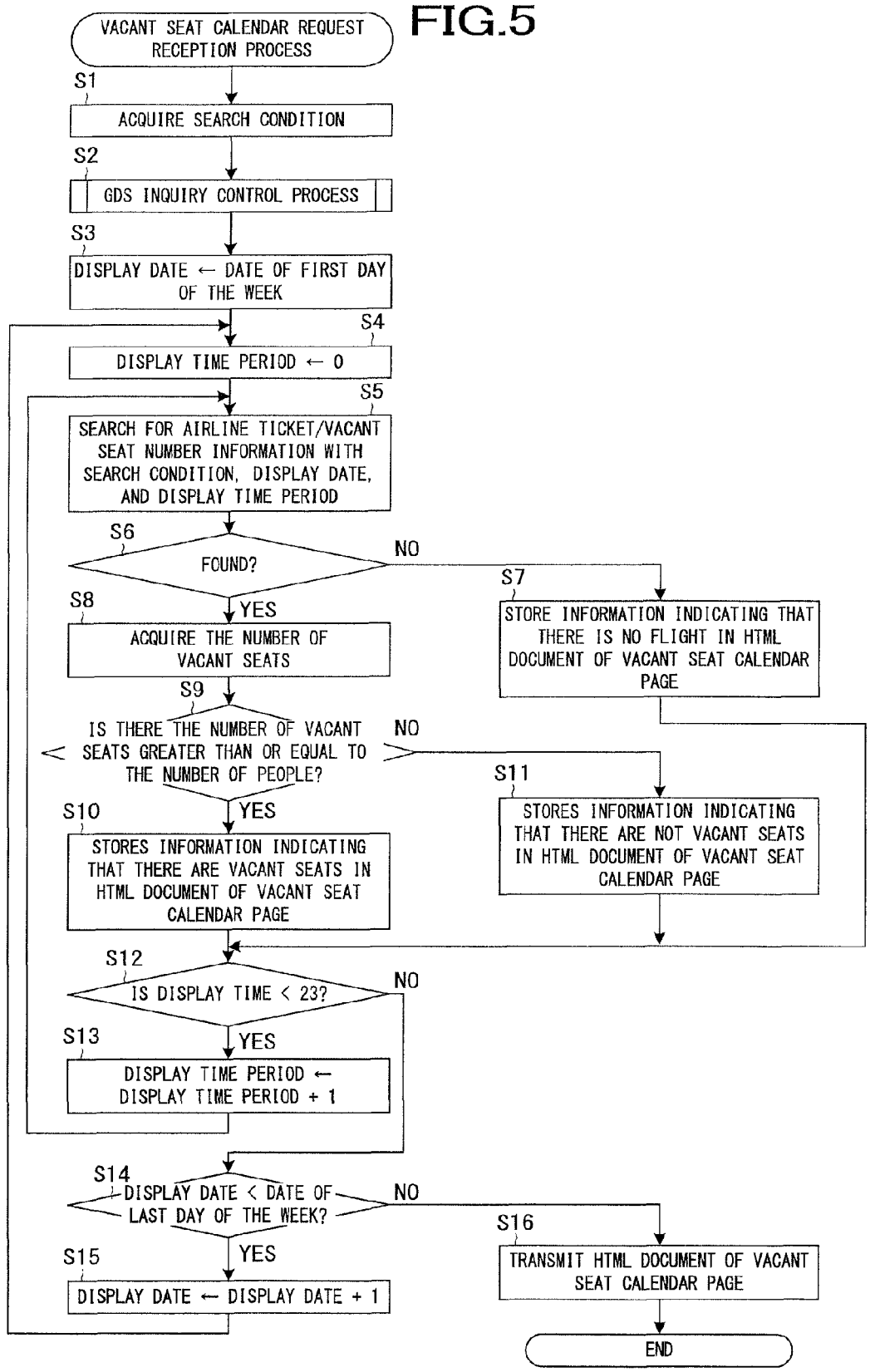

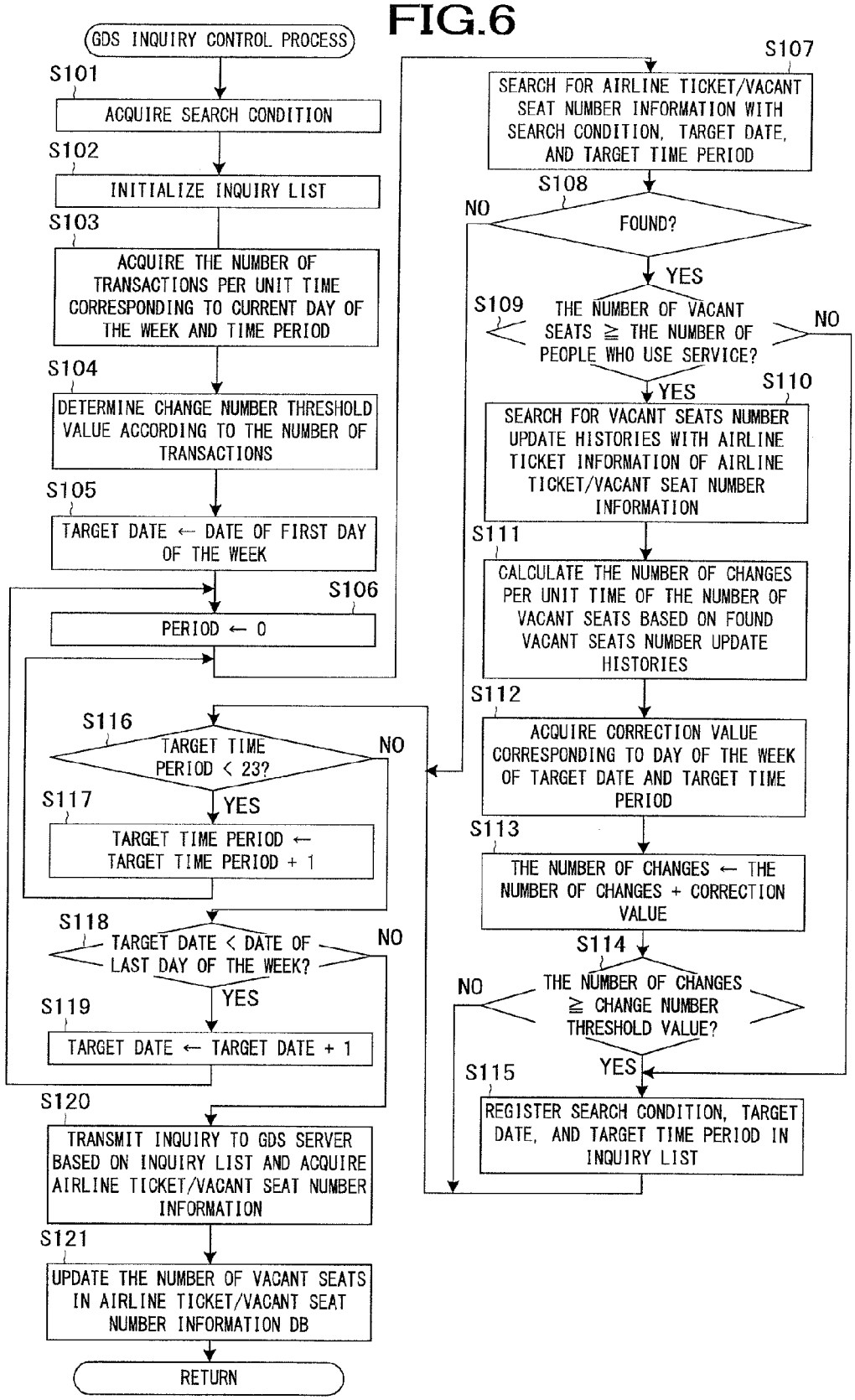

US 9,916,544 B2

INFORMATION PROVIDING APPARATUS FOR PROVIDING RESERVATION INFORMATION WITH REDUCED RESPONSE DELAY, INFORMATION PROVIDING METHOD, INFORMATION PROVIDING PROGRAM, AND RECORDING MEDIUM

CROSS REFERENCE TO RELATED APPLICATIONS

This application is a National Stage of International Application No. PCT/JP2012/054580 filed Feb. 24, 2012, claiming priority based on Japanese Patent Application No. 2011-146824 filed Jun. 30, 2011, the contents of all of which are incorporated herein by reference in their entirety.

TECHNICAL FIELD

The present invention relates to a technical field of an information providing apparatus and an information providing method for providing a state of available spots of a service to be reserved in a reservation system that accepts reservation of the service.

BACKGROUND ART

Conventionally, a reservation system is known which accepts, on the Internet, reservation of a service such as an accommodation reservation of an accommodation facility and a ticket reservation of a transport facility. In a service that requires reservation, an upper limit of the number of services (for example, the number of guest rooms, the number of seats, and the like) that can be provided in a certain period has been determined. Therefore, the reservation system manages the number of available spots to prevent double booking from occurring.

As a system that accepts reservation of airline ticket, an airline ticket reservation management system is known. As an example of the airline ticket reservation management system, there is a GDS (Global Distribution System) described in Patent Document 1. The airline ticket reservation management system collectively manages the number of vacant seats of each airline company. The airline ticket reservation management system provides airline ticket information, information of the number of vacant seats, and the like to a plurality of travel agents and the like. An information providing apparatus included in each travel agent inquires of the airline ticket reservation management system about a vacant seat status in order to determine whether or not there is a vacant seat in a flight that satisfies conditions specified by a user. At this time, it takes a time of, for example, several seconds to several tens of seconds for a response to the inquiry to be returned from the airline ticket reservation management system. Therefore, the information providing apparatus holds the number of vacant seats which is acquired from the airline ticket reservation management system as a cache and normally provides a vacant seat status to a terminal device based on the held number of vacant seats. For example, when receiving a request of reservation or an inquiry request of vacant seats from a user, the information providing apparatus inquires of the airline ticket reservation management system about the latest vacant seat status.

CITATION LIST

Patent Document

Patent Document 1: JP 2002-117266 A

SUMMARY OF INVENTION

Technical Problem

However, the number of vacant seats managed by the airline ticket reservation management system may change at all times, so that the number of vacant seats held by the information providing apparatus may be different from the latest number of vacant seats. Thereby, user's convenience may be degraded. For example, if the vacant seat status provided from the information providing apparatus shows there are not vacant seats even though the latest number of vacant seats shows there are vacant seats of which the number required by a user, the user lose a chance to reserve the seats.

On the other hand, if the vacant seat status provided from the information providing apparatus shows there are vacant seats required by the user even though the latest number of vacant seats shows there are not vacant seats of which the number required by a user, the user determines that the seats can be reserved. When the user performs an operation to reserve the seats, the information providing apparatus acquires the latest vacant seat status from the airline ticket reservation management system. As a result, the user is informed that there are not the vacant seats. The user who is informed that there are not the vacant seats inquires about vacant seats of other airline tickets or searches for airline tickets again. Therefore, the time for the user to wait for a response from the information providing apparatus and the time required for the search increase.

However, if the information providing apparatus acquires the latest vacant seat status from the airline ticket reservation management system, the time required to acquire the latest information increases according to the number of services where the number of vacant seats is to be acquired.

The present invention is made in view of the above situation, and an object of the present invention is to provide an information providing apparatus, an information providing method, an information providing program, and a recording medium which can provide a state of available spots as new as possible for services related to information required by a user while reducing the number of services where the number of available spots is acquired from the management apparatus that manages the number of available spots.

Solution to Problem

In order to solve the above problem, an aspect of the invention provides an information providing apparatus comprising: a control means that caches, based on a number of available spots which is periodically acquired from a management apparatus managing numbers of available spots of services, a number of available spots of a reservation target in a cache means for each reservation target identified by a combination of a service and a time of providing the service; an estimation means that estimates, for each of a plurality of reservation targets corresponding to a request of a user, a probability that information related to a reservation target is browsed by the user; a number-of-available spots acquisition means that acquires the number of available spots of a reservation target where the probability estimated by the estimation means is greater than or equal to a threshold value from the management apparatus and acquires the number of available spots of a reservation target where the probability estimated by the estimation means is smaller than the threshold value from the cache means; and a providing means that provides a state of available spots of each of the plurality of reservation targets, the state of available spots corresponding to the number of available spots which is acquired by the number-of-available spots acquisition means.

According to the invention, the number of available spots of a reservation target where the probability that information is browsed by the user is greater than or equal to the threshold value is acquired from the management apparatus and the number of available spots of a reservation target where the probability that information is browsed by the user is smaller than the threshold value is acquired from the cache means, so that it is possible to make a state of available spots as new as possible for a reservation target related to information required by the user and provide it while reducing the number of reservation targets where the number of available spots is acquired from the management apparatus.

An aspect of the invention provides is the information providing apparatus, further comprising: a number-of-changes acquisition means that acquires a number of changes per predetermined time of the number of available spots of each of the plurality of reservation targets corresponding to the request of the user, wherein the estimation means estimates the probability according to the number of changes which is acquired by the number-of-changes acquisition means.

It is assumed that the greater the number of changes per predetermined time of the number of available spots is, the higher the frequency at which the transaction of the reservation target is performed and the higher the frequency at which information of the reservation target is browsed is. According to the invention, it is possible to estimate the probability that information related to a reservation target is browsed by using the number of changes per predetermined time of the number of available spots.

An aspect of the invention provides the information providing apparatus, further comprising: a correction information acquisition means that acquires, from a correction information storage means that stores correction information for correcting the number of changes for each of a plurality of periods included in a predetermined unit period, the correction information corresponding to a period including a time of providing a reservation target for each of the plurality of reservation targets corresponding to the request of the user, wherein the estimation means estimates the probability based on the number of changes which is acquired by the number-of-changes acquisition means and the correction information acquired by the correction information acquisition means.

According to the invention, if the browsing frequency of information of the user is different according to the time when the reservation target is provided, it is possible to improve the estimation accuracy of the probability that information related to the reservation target is browsed by the user by setting correction information according to the browsing frequency.

An aspect of the invention provides the information providing apparatus, wherein the request of the user includes a number of uses of a reservation target, and the information providing apparatus further includes a determination means that determines, according to a difference between the number of available spots of each of the plurality of reservation targets which is cached in the cache means and the number of uses, the threshold value corresponding to each reservation target.

The information required by the user is generally whether or not the number of available spots is greater than or equal to the number of available spots that the user wants to use. Therefore, When the number of available spots cached in the cache means is changed to a new number of available spots acquired from the management apparatus, if the change crosses over the number of uses, it is preferable to acquire the number of available spots from the management apparatus, and if the change does not crosses over the number of uses, it is not necessary to acquire the number of available spots from the management apparatus. According to the invention, the threshold value according to the difference between the number of available spots and the number of people is determined, so that it is possible to estimate whether or not the number of available spots changes to cross over the number of uses.

An aspect of the invention provides the information providing apparatus, further comprising: a number-of-transactions calculation means that calculates, based on transaction histories stored in a transaction history storage means storing transaction histories of reservation targets, a number of transactions of a reservation target per predetermined time for each of a plurality of periods included in a predetermined unit period; and a determination means that determines the threshold value according to the number of transactions in a period including a time of receiving the request of the user among the numbers of transactions which are calculated by the number-of-transactions calculation means so that the greater the number of transactions is, the smaller the threshold value is.

It is assumed that the more frequently the transaction is performed in a period, the higher the frequency at which the information related to the reservation target is browsed by the user in the period. According to the invention, the threshold value is determined according to the number of transactions of the reservation target per predetermined time based on the transaction history, so that it is possible to improve the estimation accuracy of the probability that information related to the reservation target is browsed by the user.

An aspect of the invention provides the information providing apparatus, further comprising: a second providing means that provides a state of available spots of a plurality of reservation targets provided in a predetermined period corresponding to the request of the user for each of a plurality of periods included in the predetermined period; and an identification means that identifies, from among the plurality of periods, a period designated by the user as a browsing period, information related to the reservation targets which are provided in the browsing period being browsed; wherein, based on designation histories stored in a designation history storage means storing designation histories of the browsing periods, the estimation means estimates a probability, for each of the plurality of periods, that a period is designated next time under a condition in which the period identified by the identification means has been designated, and the providing means provides the state of available spots of the plurality of reservation targets for each of the plurality of periods.

According to the invention, the probability that a period is designated by the user after a certain period is designated by the user is estimated for each of a plurality of periods based on the histories of the user's designating periods, so that it is possible to estimate the probability that the user browses information related to a reservation target.

An aspect of the invention provides the information providing apparatus, further comprising: an identification means that identifies, from among the plurality of reservation targets corresponding to the request of the user, a reservation target designated by the user, information related to the designated reservation target being browsed; and an attribute acquisition means that acquires, from a attribute storage means storing an attribute of each transaction target, an attribute of the reservation target identified by the identification means and an attribute of each of the plurality of reservation targets corresponding to the request of the user; wherein the estimation means compares the attribute of the reservation target identified by the identification means and the attribute of each of the plurality of reservation targets and estimates the probability based on the comparison result.

After information related to a certain reservation target is browsed, information related to a reservation target having an attribute similar to that of the certain reservation target is likely to be browsed. According to the invention, it is possible to estimate a probability that information is browsed after information related to a certain reservation target is browsed based on an attribute of a reservation target.

An aspect of the invention provides the information providing apparatus, wherein the request of the user includes a number of uses of a reservation target, the information providing apparatus further includes an identification means that identifies a reservation target of which a inquiry of a state of available spots is requested by the user from among the plurality of reservation targets corresponding to the request of the user, and a state-of-available spots acquisition means that acquires a state of available spots of the reservation target identified by the identification means from the management apparatus, and the number-of-available spots acquisition means acquires the number of available spots of a reservation target where the probability is greater than or equal to the threshold value from the management apparatus when the number of available spots of the reservation target identified by the identification means is smaller than the number of uses based on the state of available spots acquired by the state-of-available spots acquisition means.

If the number of available spots of a reservation target where a inquiry of the number of available spots is requested by the user is greater than or equal to the number of uses, there is a probability that the user reserves the use of the reservation target, so that there is a probability that the user does not browse information related to other reservation targets after that. On the other hand, if the number of available spots of a reservation target where an inquiry of the number of available spots is requested is smaller than the number of uses, there is a probability that the user browses information related to another reservation target after that. According to the invention, when the probability that information is browsed by the user is greater than or equal to the threshold value, the number of available spots is not acquired from the management apparatus, so that it is possible to reduce the number of reservation targets where the number of available spots is acquired from the management apparatus.

An aspect of the invention provides the information providing apparatus, wherein the request of the user includes a number of uses of a reservation target, the information providing apparatus further includes an identification means that identifies a reservation target of which a inquiry of a state of available spots is requested by the user from among the plurality of reservation targets corresponding to the request of the user, and the number-of-available spots acquisition means acquires the number of available spots of a reservation target where the probability is greater than or equal to the threshold value and a state of available spots of the reservation target identified by the identification means from the management apparatus.

According to the invention, it is possible to acquire the state of available spots of a reservation target where a inquiry of the number of available spots is requested by the user and the number of available spots of a reservation target where the probability that information is browsed by the user is greater than or equal to the threshold value from the management apparatus by one-time acquisition action, so that it is possible to reduce the time required to complete the acquisition of the number of available spots when the number of available spots of a reservation target where a inquiry of the number of available spots is requested is smaller than the number of uses.

An aspect of the invention provides the information providing apparatus, further comprising: a request receiving means that receives at least one of a reservation request of a reservation target and a cancellation request of a reservation from a terminal device; and an update means that updates the number of available spots cached in the cache means based on the reservation request or the cancellation request received by the request receiving means.

According to the invention, it is possible to approximate the number of available spots cached in the cache means to the number of available spots managed by the management apparatus. Thereby, it is possible to approximate the state of available spots of a reservation target where the number of available spots is not acquired from the management apparatus to the latest state of available spots.

An aspect of the invention provides the information providing apparatus, wherein the number-of-available spots acquisition means acquires the number of available spots of a reservation target where the probability is greater than or equal to the threshold value and a reservation target where the number of available spots cached in the cache means is smaller than a second threshold value among the plurality of reservation targets corresponding to the request of the user from the management apparatus.

According to the invention, the number of available spots of a reservation target that would not be reserved by the user if the state of available spots indicating the number of available spots is smaller than the second threshold value were presented to the user is changed to a new number of available spots, which is acquired from the management apparatus. Accordingly, the state of available spots presented to the user may possibly be greater than or equal to the second threshold value. Therefore, it is possible to increase chances to make a reservation.

An aspect of the invention provides is an information providing method performed by an information providing apparatus, the information providing method comprising: a control step of caching, based on a number of available spots which is periodically acquired from a management apparatus managing numbers of available spots of services, a number of available spots of a reservation target in a cache means for each reservation target identified by a combination of a service and a time of providing the service; an estimation step of estimating, for each of a plurality of reservation targets corresponding to a request of a user, a probability that information related to a reservation target is browsed by the user; a number-of-available spots acquisition step of acquiring the number of available spots of a reservation target where the probability estimated in the estimation step is greater than or equal to a threshold value from the management apparatus and acquires the number of available spots of a reservation target where the probability estimated in the estimation step is smaller than the threshold value from the cache means; and a providing step of providing a state of available spots of each of the plurality of reservation targets, the state of available spots corresponding to the number of available spots which is acquired in the number-of-available spots acquisition step.

An aspect of the invention provides an information providing program that causes a computer included in an information providing apparatus to function as: a control means that caches, based on a number of available spots which is periodically acquired from a management apparatus managing numbers of available spots of services, a number of available spots of a reservation target in a cache means for each reservation target identified by a combination of a service and a time of providing the service; an estimation means that estimates, for each of a plurality of reservation targets corresponding to a request of a user, a probability that information related to a reservation target is browsed by the user; a number-of-available spots acquisition means that acquires the number of available spots of a reservation target where the probability estimated by the estimation means is greater than or equal to a threshold value from the management apparatus and acquires the number of available spots of a reservation target where the probability estimated by the estimation means is smaller than the threshold value from the cache means; and a providing means that provides a state of available spots of each of the plurality of reservation targets, the state of available spots corresponding to the number of available spots which is acquired by the number-of-available spots acquisition means.

An aspect of the invention provides a recording medium in which an information providing program is computer-readably recorded, the information providing program causing a computer included in an information providing apparatus to function as: a control means that caches, based on a number of available spots which is periodically acquired from a management apparatus managing numbers of reservation available spots of services, a number of available spots of a reservation target in a cache means for each reservation target identified by a combination of a service and a time of providing the service; an estimation means that estimates, for each of a plurality of reservation targets corresponding to a request of a user, a probability that information related to a reservation target is browsed by the user; a number-of-available spots acquisition means that acquires the number of available spots of a reservation target where the probability estimated by the estimation means is greater than or equal to a threshold value from the management apparatus and acquires the number of available spots of a reservation target where the probability estimated by the estimation means is smaller than the threshold value from the cache means; and a providing means that provides a state of available spots of each of the plurality of reservation targets, the state of available spots corresponding to the number of available spots which is acquired by the number-of-available spots acquisition means.

Advantageous Effect of Invention

According to the present invention, the number of available spots of a reservation target where the probability that information is browsed by the user is greater than or equal to the threshold value is acquired from the management apparatus and the number of available spots of a reservation target where the probability that information is browsed by the user is smaller than the threshold value is acquired from the cache means, so that it is possible to make a state of available spots as new as possible for a reservation target related to information required by the user and provide it while reducing the number of reservation targets where the number of available spots is acquired from the management apparatus.

BRIEF DESCRIPTION OF DRAWINGS

FIG. 2 is a display example of a vacant seat calendar page in which a weekly calendar is displayed.

FIG. 4A is a diagram illustrating an example of content registered in a member information DB 12$a$ according to the embodiment. FIG. 4B is a diagram illustrating an example of content registered in an airline ticket/vacant seat number information DB 12$b$. FIG. 4C is a diagram illustrating an example of content registered in a vacant seat number update history DB 12$c$. FIG. 4D is a diagram illustrating an example of content registered in a reservation information DB 12$d$. FIG. 4E is a diagram illustrating an example of content registered in a transaction history DB 12$e$. FIG. 4F is a diagram illustrating an example of content registered in an operation history DB 12$f$.

FIG. 5 is a flowchart illustrating a process example of a vacant seat calendar request reception process in an example of a system control unit 14 of the airline ticket reservation server 3 according to the embodiment.

FIG. 6 is a flowchart illustrating a process example of a GDS inquiry control process in an example of the system control unit 14 of the airline ticket reservation server 3 according to the embodiment.

DESCRIPTION OF EMBODIMENTS

Hereinafter, an embodiment of the present invention will be described in detail with reference to the drawings. The embodiment described below is an embodiment where the present invention is applied to an airline ticket reservation system.

1. Schematic Configuration and Function of Airline Ticket Reservation System

Figure 1:
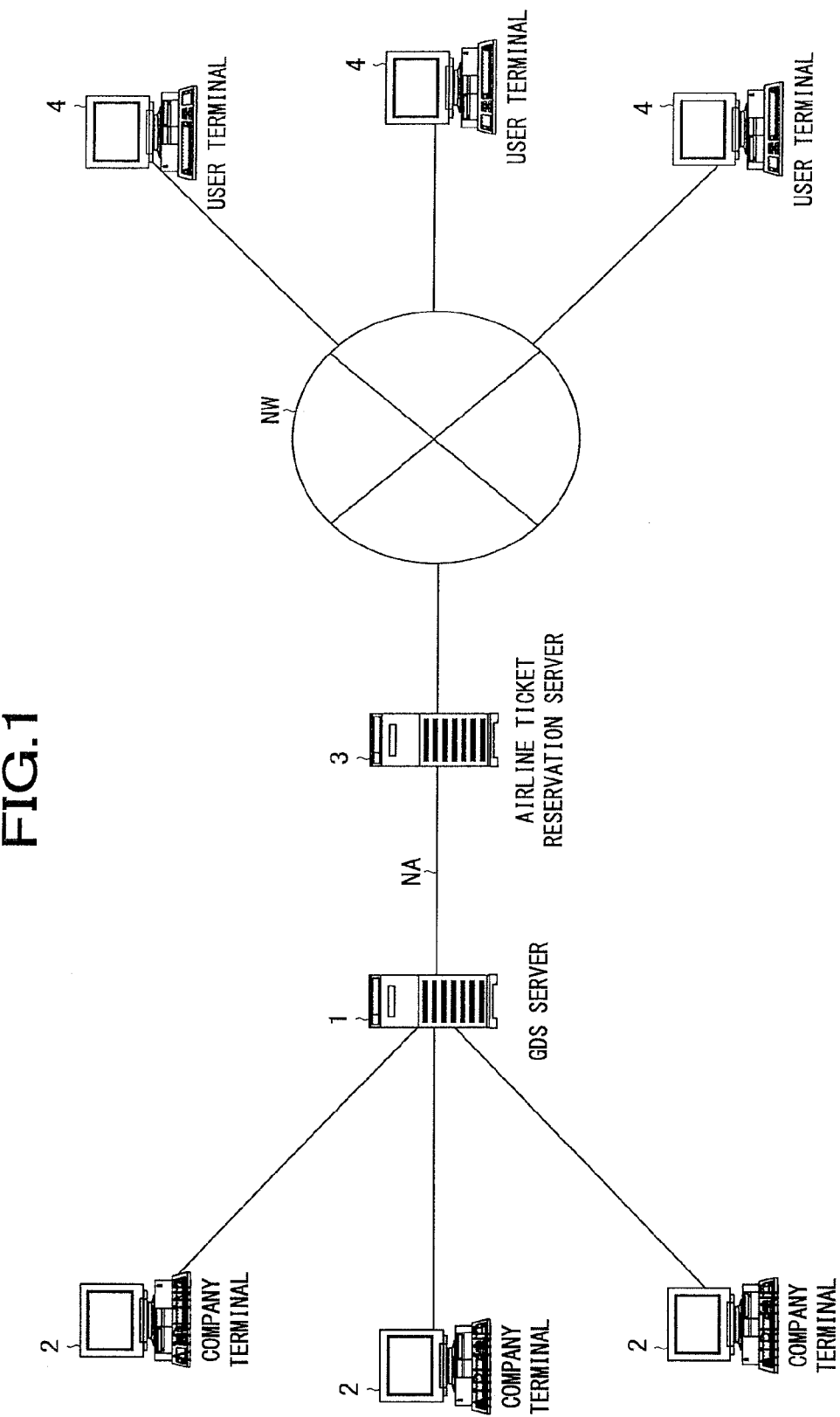
FIG. 1 is a diagram illustrating an example of a schematic configuration of an airline ticket reservation system S according to an embodiment.

First, schematic configuration and function of an airline ticket reservation system S according to the present embodiment will be described with reference to FIGS. 1 and 2. FIG. 1 is a diagram illustrating an example of a schematic configuration of the airline ticket reservation system S according to the present embodiment.

As illustrated in FIG. 1, the airline ticket reservation system S includes a GDS server 1, a plurality of airline company terminals 2, an airline ticket reservation server 3, and a plurality of user terminals 4. The airline ticket reservation server 3 and each user terminal 4 can transmit and receive data to and from each other through a network NW by using, for example, TCP/IP as a communication protocol. The network NW includes, for example, the Internet, a dedicated communication line (for example, a CATV (Community Antenna Television line), a mobile communication network (including a base station and the like), and a gateway. The airline ticket reservation server 3 and the GDS server 1 are connected to each other through, for example, a dedicated line NA. The GDS server 1 and each airline company terminal 2 are connected to each other through, for example, a dedicated line.

The GDS server 1 (an example of a management apparatus in the present invention) is a GDS server device which is a computer reservation system for arranging to make a reservation of airline tickets (arranging to make a reservation of use of an airplane transport service) of a plurality of airline companies. The GDS server 1 includes databases for managing information related to an airplane transport service (hereinafter referred to as "airline ticket information") assigned as a reservation target by each airline company, the number of vacant seats in the airplane transport service (an example of the number of vacant seats in the present invention), and the like. Information including the airline ticket information and the number of vacant seats is referred to as "airline ticket/vacant seat number information". Each individual service in the airplane transport service is identified by, for example, a flight number, a date and time of departure, and a reservation class. The reservation class determines, for example, a seat class, a validity period of an airline ticket, an accumulation rate of mileage, and the like. A service identified by the flight number, the date and time of departure, and the reservation class is referred to as an "individual flight service" (an example of a reservation target in the present invention). An individual flight service that can be used is identified by an airline ticket. The GDS server 1 manages the airline ticket/vacant seat number information for each individual flight service.

The GDS server 1 provides the airline ticket information in response to, for example, an inquiry from a server device included in a travel agent and the like. Further, the GDS server 1 performs reservation processing or reservation cancellation processing corresponding to a request from a server device included in a travel agent and the like and updates the number of vacant seats registered in the database according to the processing result. Further, the GDS server 1 transmits the airline ticket/vacant seat number information registered in the database to the airline ticket reservation server 3 in push mode, for example, at predetermined time intervals (hereinafter referred to as "update intervals of the number of vacant seats"). One or a plurality of server devices included in a travel agent and the like are connected to the GDS server 1, although the server devices are not shown in FIG. 1.

The airline company terminal 2 is a terminal device used by an airline company. For example, the airline company registers information related to an airline ticket and the number of seats in the GDS and checks a reservation state and the number of vacant seats by operating the airline company terminal 2. The airline company terminal 2, for example, includes a personal computer.

The airline ticket reservation server 3 (an example of an information providing apparatus in the present invention) is a server device that performs various processes related to a web site that accepts a reservation of airline ticket (hereinafter referred to as an "airline ticket reservation site"). The airline ticket reservation server 3 includes an airline ticket/vacant seat number information DB (database) 12*b* described later in which the airline ticket/vacant seat number information is registered. The number of vacant seats in the airline ticket/vacant seat number information registered in the airline ticket/vacant seat number information DB 12*b* is updated by the number of vacant seats in the airline ticket/vacant seat number information periodically transmitted from the GDS server 1. The airline ticket reservation server 3 provides information related to an individual flight service and the vacant seat status to the user terminal 4 and performs reservation processing of airline ticket or reservation cancellation processing, corresponding to a request from the user terminal 4. The airline ticket/vacant seat number information DB 12*b* functions as a cache to reduce response delay caused by the airline ticket reservation server 3 inquiring of the GDS server 1 about the number of vacant seats to provide a vacant seat status to the user terminal 4.

The user terminal 4 (an example of a terminal device in the present invention) is a terminal device of a user who uses the airline ticket reservation site. The user terminal 4 receives a web page from the airline ticket reservation server 3 and displays the web page by accessing the airline ticket reservation server 3, based on an operation from the user. In the user terminal 4, software such as a browser and an email client is installed. For example, a personal computer, a PDA (Personal Digital Assistant), a mobile information terminal such as a smartphone, and a mobile phone are used as the user terminal 4.

In the airline ticket reservation system S having such a configuration, the airline ticket reservation server 3 can cause the user terminal 4 to display, in a calendar, a vacant seat status corresponding to one or more individual flight services satisfying conditions specified by the user. This calendar is referred to as a "vacant seat calendar". A web page in which the vacant seat calendar is displayed is referred to as a "vacant seat calendar page". As the vacant seat calendar, there are a monthly calendar and a weekly calendar. In the monthly calendar, a vacant seat status in a month (an example of a unit period in the present invention) corresponding to a month and a year specified by the user is displayed for each day based on a departure date. In the weekly calendar, a vacant seat status in a week (an example of a unit period in the present invention) specified by the user is displayed for each hour based on a departure date and time of a flight. The display content and the processing content of the airline ticket reservation server 3 are basically the same between the monthly calendar and the weekly calendar except that the period of a unit of display of the vacant seat status and the entire period in which the vacant seat status is displayed are different, so that the case in which the weekly calendar is displayed will be mainly described.

FIG. 2 is a display example of the vacant seat calendar page in which the weekly calendar is displayed. As illustrated in FIG. 2, a calendar area 110, a previous week link 120, a next week link 130, and the like are displayed in the vacant seat calendar page. In each field in the calendar area 110, "◯", "X", or "-" is displayed as a vacant seat status. "◯" indicates that there are one or more vacant seats. "X" indicates that there is no vacant seat. "-" indicates that there is no individual flight service satisfying the conditions. When the user specifies the number of people who uses the airplane transport service, "◯" indicates that there are vacant seats of which the number is greater than or equal to the number of people, and "X" indicates that there are not vacant seats of which the number is greater than or equal to the number of people. When the user does not specify the number of people, "◯" indicates that there are vacant seats of which the number is greater than or equal to a predetermined number of seats (for example, one seat), and "X" indicates that there are no vacant seats of which the number is greater than or equal to the predetermined number of seats.

Further, "◯" is a hyperlink to a web page (hereinafter referred to as "individual flight service list page") in which a list of information of individual flight services where the airplane departs in a corresponding date and time period is displayed. In the individual flight service list page, for example, information including an airline company name, a flight number, a seat class, a departure date, a departure place, a departure airport, a departure time, an arrival date, an arrival place, an arrival airport, an arrival time, etc. is displayed for each individual flight service. In the individual flight service list page, a vacant seat inquiry button to inquire vacant seats is displayed for each individual flight service. When the user selects the vacant seat inquiry button, the airline ticket reservation server 3 inquires of the GDS server 1 whether or not there are vacant seats of which the number is greater than or equal to the number of people specified by the user. At this time, if there are vacant seats of which the number is greater than or equal to the number of people, a reservation button is displayed at a corresponding flight in the individual flight service list page. Alternatively, a reservation button may be displayed in advance corresponding to each piece of information of the individual flight services displayed as a list. In this case, the reservation buttons corresponding to the individual flight services in which there are vacant seats of which the number is greater than or equal to the number of people may be displayed in an active state (a state in which the user can select the button), and the reservation buttons corresponding to the individual flight services in which there are vacant seats of which the number is smaller than the number of people may be displayed in an inactive state (a state in which the user cannot select the button).

When the user selects the reservation button and inputs necessary information, the airline ticket reservation server 3 requests the GDS server 1 to make a reservation for the number of people specified by the user and causes the user terminal 4 to display a result indicating whether or not the reservation can be made. Further, in the individual flight service list page, a vacant seat calendar return button is displayed. The vacant seat calendar return button is a button to redisplay the vacant seat calendar that is previously displayed.

The previous week link 120 is a hyperlink to display a vacant seat calendar page of the week previous to the week for which the vacant seat status is currently displayed. The next week link 130 is a hyperlink to display a vacant seat calendar page of the next week of the week for which the vacant seat status is currently displayed.

The vacant seat calendar page can be displayed by various methods. For example, the user specifies a search condition to search for an individual flight service on the airline ticket reservation site. A necessary condition includes, for example, a departure place, an arrival place, and a departure date. An optional condition includes a specification of, for example, a departure airport, an arrival airport, an airline company, a seat class, the number of people, a fare range, a direct flight or indirect flight, and a departure time/a boarding time period (morning departure or afternoon departure). When the user specifies a search condition and then selects a search button, the airline ticket reservation server 3 searches for individual flight services that satisfy the search condition and a web page illustrating a search result (hereinafter referred to as a "search result page") is displayed on a screen of the user terminal 4. In the search result page, information of the found individual flight services is displayed for each item for sale of an airplane transport service as a list. The item for sale of an airplane transport service is a collection of a plurality of individual flight services related to each other. For example, a plurality of airline tickets of the same airline company, the same departure city and arrival city (departure place and arrival place), and the same reservation class are collected into one item for sale. Here, when the user selects a vacant seat calendar button displayed outside the list of the search result in the search result page, a vacant seat calendar page is displayed. In this case, in the vacant seat calendar page, vacant seat statuses of individual flight services whose departure date is this week among individual flight services that satisfy the condition specified by the user except for the departure date are displayed. Further, when the user selects a vacant seat calendar button corresponding to any one of items for sale in the search result list, a vacant seat calendar page is displayed. In this case, in the vacant seat calendar page, vacant seat statuses of airline tickets which satisfy the condition specified by the user except for the departure date and whose departure date is this week in an item for sale corresponding to the selected vacant seat calendar button are displayed.

When the airline ticket reservation server 3 provides a vacant seat calendar page, the airline ticket reservation server 3 checks the number of vacant seats in each period where the vacant seat status is displayed. The number of vacant seats registered in the airline ticket/vacant seat number information DB 12*b* is periodically updated, so that the number of vacant seats registered in the airline ticket/vacant seat number information DB 12*b* may be older than the latest number of vacant seats managed by the GDS server 1. Here, for example, if the airline ticket reservation server 3 tries to acquire the numbers of vacant seats for one week from the GDS server 1, there are many corresponding individual flight services, so that the search time of the GDS server 1 increases. Therefore, the time required for an inquiry (the time from when the airline ticket reservation server 3 transmits an inquiry message to when the airline ticket reservation server 3 receives the numbers of vacant seats) increases.

Therefore, for each of a plurality of periods where the vacant seat status is displayed, the airline ticket reservation server 3 estimates a probability (hereinafter referred to as a "browsing probability") that the user browses flight information. In other words, the airline ticket reservation server 3 estimates a probability that an individual flight service list page is displayed by user's selection operation on a vacant seat calendar page. Then, among individual flight services where the airplane departs in a certain week (or month), the airline ticket reservation server 3 acquires the numbers of vacant seats of individual flight services where the airplane departs in a time period (or a day) where the browsing probability is greater than or equal to a predetermined threshold value from the GDS server 1, and acquires the numbers of vacant seats of individual flight services where the airplane departs in a time period where the browsing probability is smaller than the threshold value from the airline ticket/vacant seat number information DB 12b. In other words, the airline ticket reservation server 3 acquires the latest number of vacant seats for an individual flight service where the probability that the user needs information of the individual flight service is estimated to be high, and acquires the number of vacant seats that may be old for an individual flight service where the probability that the user needs information of the individual flight service is estimated to be low. Then, the airline ticket reservation server 3 provides a vacant seat calendar page based on the acquired numbers of vacant seats. Even if the vacant seat status of a period where the user does not need information reflects the number of old vacant seats, there is no problem because it is not needed in the first place. In this way, the airline ticket reservation server 3 reduces the time required to acquire the numbers of vacant seats from the GDS server 1.

2. Configuration of Airline Ticket Reservation Server

Next, a configuration of the airline ticket reservation server 3 will be described with reference to FIGS. 3 and 4.

Figure 3:
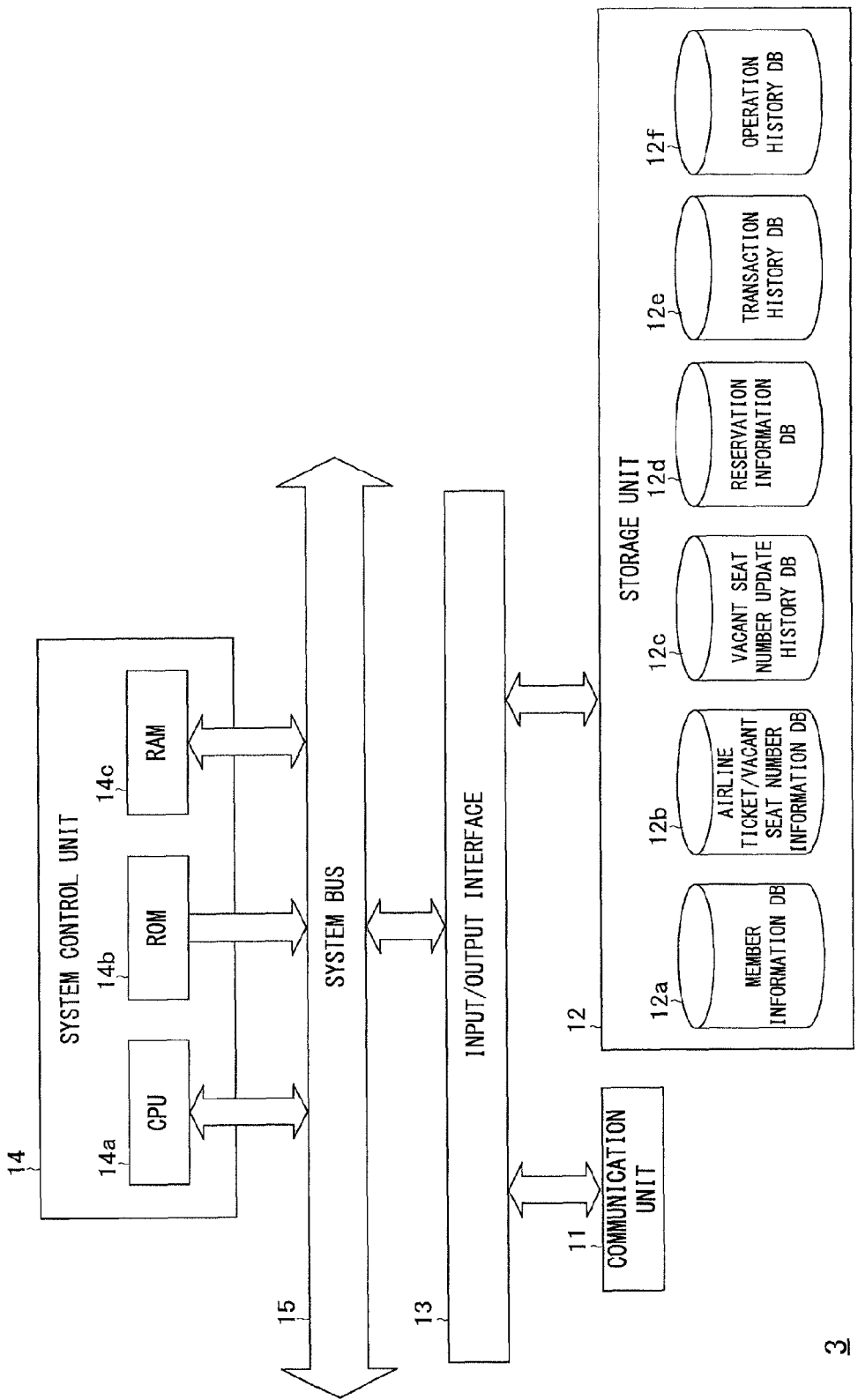
FIG. 3 is a block diagram illustrating an example of a schematic configuration of an airline ticket reservation server 3 according to the embodiment.

FIG. 3 is a block diagram illustrating an example of a schematic configuration of the airline ticket reservation server 3 according to the present embodiment. As illustrated in FIG. 3, the airline ticket reservation server 3 includes a communication unit 11, a storage unit 12, an input/output interface 13, and a system control unit 14. The system control unit 14 and the input/output interface 13 are connected to each other through a system bus 15.

The communication unit 11 connects to the network NW and controls communication state with the user terminals 4 and the like.

The storage unit 12 (an example of a cache means, a correction information storage means, a transaction history storage means, a specified history storage means, and an attribute storage means of the present invention) includes, for example, a hard disk drive and the like. In the storage unit 12, databases that are a member information DB 12a, a airline ticket/vacant seat number information DB 12b, a vacant seat number update history DB 12c, a reservation information DB 12d, a transaction history DB 12e, an operation history DB 12f, etc. are constructed.

FIG. 4A is a diagram illustrating an example of content registered in the member information DB 12a according to the present embodiment. In the member information DB 12a, member information related to users registered in the airline ticket reservation system S as a member is registered. Specifically, in the member information DB 12a, a user ID, a password, a nickname, a name, a date of birth, a gender, an address, a phone number, an email address, and the like are registered in association with each user. The user ID is identification information of the user.

FIG. 4B is a diagram illustrating an example of content registered in the airline ticket/vacant seat number information DB 12b according to the present embodiment. In the airline ticket/vacant seat number information DB 12b, the airline ticket/vacant seat number information is registered. Specifically, in the airline ticket/vacant seat number information DB 12b, the airline ticket information, and the number of vacant seats are registered for each individual flight service. The airline ticket information includes attributes of an individual flight service, which attributes include, for example, an item number, an airline company code, a flight number, a departure place, an arrival place, a departure airport, an arrival airport, a departure date and time, an arrival date and time, a reservation class, a seat class, a type indicating a direct flight or an indirect flight, a fare. The item number is an identification number of an airplane transport service. The airline company code is an identification code of the airline company.

FIG. 4C is a diagram illustrating an example of content registered in the vacant seat number update history DB 12c according to the present embodiment. In the vacant seat number update history DB 12c, histories of updating the numbers of vacant seats that are registered in the airline ticket/vacant seat number information DB 12b with the numbers of vacant seats included in the airline ticket/vacant seat number information periodically transmitted from the GDS server 1 is registered as vacant seat number update histories. Specifically, in the vacant seat number update history DB 12c, the airline ticket information, the number of vacant seats, an update date and time, and the like are registered for each airline ticket/vacant seat number information transmitted from the GDS server 1. The update date and time is a date and time when the number of vacant seats registered in the airline ticket/vacant seat number information DB 12b is updated.

The system control unit 14 searches the airline ticket/vacant seat number information DB 12b for the same airline ticket information as the airline ticket information included in the airline ticket/vacant seat number information transmitted from the GDS server 1 in push mode, and updates the airline ticket/vacant seat number information DB 12b by overwriting the number of vacant seats corresponding to the found airline ticket information with the number of vacant seats included in the acquired airline ticket/vacant seat number information. Further, the system control unit 14 registers the airline ticket/vacant seat number information transmitted from the GDS server 1 in push mode in the vacant seat number update history DB 12c. At this time, the system control unit 14 registers the current date and time as the update date and time.

The vacant seat number update history is used to calculate the number, as information corresponding to the browsing probability, of changes of the number of vacant seats per unit time. The greater the number of changes per unit time of an airline ticket is, the more frequently the transaction such as reservation and cancellation of the airline ticket is performed. The more frequently the transaction of the airline ticket is performed, the more popular to users the airline ticket is, so that the probability for users to browse information is high. The unit time is, for example, an update time interval of the number of vacant seats.

FIG. 4D is a diagram illustrating an example of content registered in the reservation information DB 12d according to the embodiment. In the reservation information DB 12d, reservation information related to content of reservation of airline tickets is registered. Specifically, in the reservation information DB 12*d*, a reservation number, a reservation date and time, a user ID, airline ticket information, the number of people, and the like are registered in association with each registration. The reservation number is an identification number to identify the reservation. The reservation date and time is a date and time when the reservation is made. The user ID is a user ID of a user who makes the reservation. The airline ticket information is airline ticket information of a reserved airline ticket.

FIG. 4E is a diagram illustrating an example of content registered in the transaction history DB 12*e* according to the present embodiment. In the transaction history DB 12*e*, transaction histories representing histories of transaction of airline tickets are registered. Specifically, in the transaction history DB 12*e*, a reservation number, a transaction date and time, a transaction type, a user ID, airline ticket information, the number of people, and the like are registered in association with each transaction. The transaction type indicates whether the transaction is reservation or cancellation. The transaction history is used to calculate the number of transactions per unit time (for example, one hour) to determine the change number threshold value as information corresponding to a threshold value that is compared with the browsing probability. The greater the number of transactions per unit time in a day of the week and a time period is, the more frequently the transaction such as reservation and cancellation is performed in the day of the week and the time period. The more frequently the transaction is performed in a day of the week and a time period, the higher the probability that users browse information in the day of the week and the time period is. Therefore, for each day of the week and each time period, a threshold value showing a probability that users may browse information is changed by setting the change number threshold value according to the number of transactions per unit time.

FIG. 4F is a diagram illustrating an example of content registered in the operation history DB 12*f* according to the present embodiment. In the operation history DB 12*f*, operation histories indicating histories of periods selected by users in the vacant seat calendar page are registered. Specifically, in the operation history DB 12*f*, a user ID, an operation date and time, a selected day of the week, and a selected time period are registered in association with each other each time a selection is performed by each user. The user ID is a user ID of a user who performs a selection operation. The operation date and time is a date and time when the selection operation is performed. The selected day of the week and the selected time period are a selected day of the week and a selected time period of the selected period. The operation histories are used to calculate a probability that a period is selected next time by a user (hereinafter referred to as a "selection probability") under a condition that the user has selected a certain period from periods where the vacant seat status is displayed in the vacant seat calendar page as information corresponding to the browsing probability. This is because there is usually a specific pattern in which a user selects a certain period and then selects another period. For example, in Example in FIG. 2, after the user selects a period between 15:00 and 16:00 on July 6, it is generally assumed that the probability that the user selects a period between 14:00 and 15:00 or between 16:00 and 17:00 on July 6 or the user selects the same period between 15:00 and 16:00 on July 5 or July 7 is higher than the probability that the user selects the other periods. The operation history is information to calculate the selection probability based on results of actual behaviors of the user.

Next, other information stored in the storage unit 12 will be described. The change number correction value determination table is stored in the storage unit 12. The change number correction value determination table is table information to determine a correction value to correct the number of changes per unit time of the number of vacant seats according to a day of the week and a time period in which the airplane departs. Specifically, in the change number correction value determination table, a correction value is stored in association with each time period from a time period between 0:00 to 1:00 to a time period between 23:00 to 24:00 on each day of the week from Sunday to Saturday. According to a day of the week and a time period in which the airplane corresponding to an individual flight service departs, the tendency of users to access information of the individual flight service may vary. Therefore, the system control unit 14 corrects the number of changes according to the tendency of the access in a day of the week and a time period in which the airplane departs. In the change number correction value determination table, for example, the higher the degree of concentration of accesses or the frequency of the access in a day of the week and a time period in which the airplane departs, the greater the correction value to be stored is. The correction value may be stored in association with only each day of the week or may be stored in association with only each time period. For example, the system control unit 14 may calculate the degree of concentration of accesses or the frequency of the access for each day of the week and each time period in which the airplane departs based on the transaction histories registered in the transaction history DB 12*e* and may determine the correction value based on the calculation result. For example, the system control unit 14 may calculates, for each day of the week and each time period, the number of transactions per unit time of an individual flight service where the airplane departs in the day of the week and the time period as the frequency of the access. In the change number correction value determination table corresponding to a monthly calendar, for example, a correction value is stored in association with only each day of the week.

The transaction number table is stored in the storage unit 12. In the transaction number table, the number of transactions per unit time is stored in association with each day of the week from Sunday to Saturday and each time period from the time period between 0:00 and 1:00 to the time period between 23:00 and 24:00. For example, the system control unit 14 periodically updates the number of transactions stored in the transaction number table for each day of the week and each time period. For example, the system control unit 14 searches the transaction history DB 12*e* for transaction histories of transactions performed in a certain day of the week and time period. At this time, the system control unit 14 limits a range of transaction date and time to be a target of search to, for example, a period from today to a predetermined number of days before. Next, the system control unit 14 calculates the number of transactions per unit time by dividing the number of the found transaction histories by the number of weeks used to limit the search range. Then, the system control unit 14 stores the number of transactions per unit time in association with a day of the week and time period where the number of transactions per unit time is calculated.

The storage unit 12 also stores various data such including HTML documents for displaying web pages, XML documents, image data, text data, electronic documents, etc. Further, the storage unit 12 stores various setting values set by an administrator or the like.

Further, the storage unit 12 stores various programs including an operating system, a WWW (World Wide Web) server program, a DBMS (Database Management System), an airline ticket reservation processing program (an example of an information providing program in the present invention), etc. The airline ticket reservation processing program is a program for performing processes including a search for airline tickets, an estimation of the browsing probability, an acquisition of the number of vacant seats from the GDS server 1, a reservation of airline tickets, etc. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU 14a, a ROM (Read Only Memory) 14b, a RAM (Random Access Memory) 14c, and the like. In the system control unit 14, the CPU 14a reads and executes various programs, so that the system control unit 14 functions as a control means, an estimation means, a number-of-available spots acquisition means, a providing means, a number-of-changes acquisition means, a correction information acquisition means, a determination means, a number-of-transactions calculation means, a second providing means, an identification means, an attribute acquisition means, a state-of-available spots acquisition means, a request receiving means, and an update means in the present invention.

The airline ticket reservation server 3 may include a plurality of server devices. For example, a server device that performs processes related to a search for airline tickets, an estimation of the browsing probability, an acquisition of the number of vacant seats from the GDS server 1, and a reservation of airline tickets, a server device that transmits a web page in response to a request from the user terminal 4, a server device that manages databases, and the like may be connected to each other by a LAN or the like.

3. Operation of Airline Ticket Reservation System

Next, an operation of the airline ticket reservation system S will be described with reference to FIGS. 5 to 13. The present embodiment will be described by dividing the description into an example 1 to an example 5 according to an estimation method of the browsing probability, the timing of estimating the browsing probability, and the timing of acquiring the number of vacant seats from the GDS server 1. It is possible to combine and implement a plurality of examples from among Examples 1 to 5.

3-1 Example 1

When the airline ticket reservation server 3 according to Example 1 transmits a vacant seat calendar page to the user terminal 4, the airline ticket reservation server 3 estimates the browsing probability and acquires the number of vacant seats from the GDS server 1. The airline ticket reservation server 3 uses the number of changes per unit time of the number of vacant seats as the browsing probability. The airline ticket reservation server 3 determines, based on the number of transactions per unit time in a day of the week and a time period in which the vacant seat calendar page is requested, the threshold value to be compared with the browsing probability.

FIG. 5 is a flowchart illustrating a process example of a vacant seat calendar request reception process in Example 1 of the system control unit 14 of the airline ticket reservation server 3 according to the present embodiment.

For example, when the vacant seat calendar button is selected on a web page such as the search result page or the previous week link 120 or the next week link 130 is selected on the vacant seat calendar page, the user terminal 4 transmits a vacant seat calendar request to the airline ticket reservation server 3. The vacant seat calendar request includes, for example, information for identifying a search condition specified by a user in advance, information indicating a week where the vacant seat status is displayed, and an item number corresponding to the vacant seat calendar button selected by the user. The vacant seat calendar request reception process is started when the airline ticket reservation server 3 receives the vacant seat calendar request.

First, the system control unit 14 acquires the search condition corresponding to the received vacant seat calendar request (step S1). For example, the system control unit 14 has received a user ID from the user terminal 4 based on a log-in operation in advance and held the user ID by session management. Further, the system control unit 14 has received the search condition specified by the user when the system control unit 14 searches for airline ticket information. The system control unit 14 temporarily has stored the received search condition, for example, in the storage unit 12 in association with the user ID. Therefore, the system control unit 14 acquires the search condition from the storage unit 12. When the item number is included in the vacant seat calendar request, the system control unit 14 adds the item number to the search condition.

Next, the system control unit 14 performs a GDS inquiry control process described later (step S2). In the GDS inquiry control process, the browsing probability is estimated for each period where the vacant seat status is displayed. Then, the number of vacant seats is acquired from the GDS server 1 according to the browsing probability and the airline ticket/vacant seat number information DB 12b is updated. Next, the system control unit 14 acquires a template of an HTML document of the vacant seat calendar page from the storage unit 12.

Next, the system control unit 14 sets a display date to the date of the first day of the week corresponding to the vacant seat calendar request (step S3). A day of the week of the first day of the week is, for example, Sunday. Next, the system control unit 14 sets a display time period to 0 (step S4).

Next, the system control unit 14 searches the airline ticket/vacant seat number information DB 12b for the airline ticket/vacant seat number information with the acquired search condition, the display date, and the display time period (step S5). Specifically, the system control unit 14 searches for the airline ticket/vacant seat number information of individual flight services which satisfy conditions included in the search condition except for the departure date and the number of people and where the departure date and time is within the display time period of the display date.

Next, the system control unit 14 determines whether or not the airline ticket/vacant seat number information is found (step S6). At this time, if the system control unit 14 determines that the airline ticket/vacant seat number information is not found (step S6: NO), the system control unit 14 stores, at a position corresponding to the display date and the display time period in the template of the HTML document of the vacant seat calendar page, information (for example, "-") indicating that there is no individual flight service (step S7). Next, the system control unit 14 proceeds to step S12.

On the other hand, if the system control unit 14 determines that the airline ticket/vacant seat number information is found (step S6: YES), the system control unit 14 acquires the number of vacant seats included in each found piece of the airline ticket/vacant seat number information from the airline ticket/vacant seat number information DB 12b (step S8). Here, the number of vacant seats corresponding to the date and the time period where the browsing probability is determined to be greater than or equal to the threshold value in the GDS inquiry control process is the latest number of vacant seats acquired from the GDS server 1 in the GDS inquiry control process. On the other hand, the number of vacant seats corresponding to the date and the time period where the browsing probability is determined to be not greater than or equal to the threshold value is the number of vacant seats that has been registered in the airline ticket/vacant seat number information DB 12b since before the GDS inquiry control process was performed.

Next, the system control unit 14 determines whether or not there are one or more numbers of vacant seats greater than or equal to the number of people included in the search condition among the acquired numbers of vacant seats (step S9). At this time, if the system control unit 14 determines that there are one or more numbers of vacant seats greater than or equal to the number of people (step S9: YES), the system control unit 14 stores, at a position corresponding to the display date and the display time period in the template of the HTML document of the vacant seat calendar page, information (for example, "○") indicating that there are vacant seats (step S10). Next, the system control unit 14 proceeds to step S12.

On the other hand, if the system control unit 14 determines that there is not the number of vacant seats greater than or equal to the number of people (step S9: NO), the system control unit 14 stores, at a position corresponding to the display date and the display time period in the template of the HTML document of the vacant seat calendar page, information (for example, "X") indicating that there are not the vacant seats (step S11). Next, the system control unit 14 proceeds to step S12.

In step S12, the system control unit 14 determines whether or not the display time period is smaller than 23. At this time, if the system control unit 14 determines that the display time period is smaller than 23 (step S12: YES), the system control unit 14 adds 1 to the display time period (step S13). Next, the system control unit 14 proceeds to step S5.

On the other hand, if the system control unit 14 determines that the display time period is not smaller than 23 (step S12: NO), the system control unit 14 determines whether or not the display date is a date before the last day of the week (step S14). At this time, if the system control unit 14 determines that the display date is a date before the last day of the week (step S14: YES), the system control unit 14 adds 1 to the display date (step S15). Next, the system control unit 14 proceeds to step S4.

On the other hand, if the system control unit 14 determines that the display date is not a date before the last day of the week (step S14: NO), the system control unit 14 transmits an HTML document of the vacant seat calendar page which is completed by setting information to the user terminal 4 which is the transmission source of the vacant seat calendar request (step S16). After completing this process, the system control unit 14 ends the vacant seat calendar request reception process.

FIG. 6 is a flowchart illustrating a process example of the GDS inquiry control process in Example 1 of the system control unit 14 of the airline ticket reservation server 3 according to the present embodiment.

First, the system control unit 14 acquires, from the storage unit 12, a search condition stored in association with the user ID of the user of the user terminal 4 that transmits a request to the system control unit 14 (step S101). Here, when the number of people is not included in the search condition, the system control unit 14 includes 1 as the number of people in the search condition. Next, the system control unit 14 initializes an inquiry list (step S102). The inquiry list is a list of conditions to inquire of the GDS server 1 about the number of vacant seats.

Next, the system control unit 14 acquires the number of transactions per unit time corresponding to the current day of the week and time period from the transaction number table (step S103). Next, the system control unit 14 determines the change number threshold value according to the acquired number of transactions (step S104). Specifically, the system control unit 14 determines the change number threshold value so that the greater the number of transactions per unit time is, the smaller the change number threshold value is.

Next, the system control unit 14 sets a target date to a date of the first day of the week (step S105). Next, the system control unit 14 sets a target time period to 0 (step S106).

Next, the system control unit 14 searches the airline ticket/vacant seat number information DB 12b for the airline ticket/vacant seat number information with the current search condition, the target date, and the target time period (step S107). The search method at this time is the same as that in step S5 of the vacant seat calendar request reception process shown in FIG. 5.

Next, the system control unit 14 determines whether or not the airline ticket/vacant seat number information is found (step S108). At this time, if the system control unit 14 determines that the airline ticket/vacant seat number information is not found (step S108: NO), the system control unit 14 proceeds to step S116. On the other hand, if the system control unit 14 determines that the airline ticket/vacant seat number information is found (step S108: YES), the system control unit 14 determines whether or not there are one or more pieces of the airline ticket/vacant seat number information where the number of vacant seats is greater than or equal to the number of people among pieces of the found airline ticket/vacant seat number information (step S109).

At this time, if the system control unit 14 determines that there is no piece of the airline ticket/vacant seat number information where the number of vacant seats is greater than or equal to the number of people (step S109: NO), the system control unit 14 registers the current search condition, the target date, and the target time period in association with each other in the inquiry list (step S115). In other words, the system control unit 14 acquires the number of vacant seats of an individual flight service that satisfies the search condition, the target date, and the target time period from the GDS server 1. There is a case in which the latest number of vacant seats managed by the GDS server 1 is greater than or equal to the number of people even though the number of vacant seats held by the airline ticket reservation server 3 is smaller than the number of people. Therefore, if the old number of vacant seats is held without change, a user may miss a chance to reserve airline tickets. Therefore, when the number of vacant seats is smaller than the number of people, the system control unit 14 acquires the latest number of vacant seats regardless of the browsing probability. In step S109, the system control unit 14 may determine whether or not the number of vacant seats is greater than or equal to the number of people for each piece of the found airline ticket/vacant seat number information, and the system control unit 14 may register pieces of the airline ticket/vacant seat number information where the number of vacant seats is smaller than the number of people in the inquiry list. In other words, the system control unit 14 may determine whether or not to acquire the number of vacant seats from the GDS server 1 for each individual flight service instead of for each target date and target time period. After completing the process of step S14, the system control unit 14 proceeds to step S116.

On the other hand, if the system control unit 14 determines that there are one or more pieces of the airline ticket/vacant seat number information where the number of vacant seats is greater than or equal to the number of people (step S109: YES), the system control unit 14 searches the vacant seat number update history DB 12*c* for the vacant seats number update histories whose update date and time is included in a predetermined period from among the vacant seats number update histories of airline tickets corresponding to pieces of the found airline ticket/vacant seat number information (step S110). For example, the system control unit 14 may search for the vacant seats number update histories that include the same item number as that included in the found airline ticket/vacant seat number information. For example, the system control unit 14 may search for the vacant seats number update histories that include the same flight number, departure date and time and reservation class as those that are included in the found airline ticket/vacant seat number information. The system control unit 14 may determine the range of the update date and time where the vacant seats number update histories are searched to be, for example, a range between today and a predetermined number of days before, or to be a range of a predetermined days around today of the last year or years before.

Next, the system control unit 14 calculates, based on the found vacant seats number update histories, the number of changes per unit time of the number of vacant seats (step S111). For example, the system control unit 14 sorts the vacant seats number update histories having the same flight number, the same departure date and time, and the same reservation class in ascending order of the update date and time. Then, the system control unit 14 calculates an absolute value of a difference between the numbers of vacant seats for each update interval. For example, it is assumed that the update interval of the number of vacant seats is 15 minutes. Here, when the number of vacant seats at a certain update date and time is 10 and the number of vacant seats 15 minutes after that is 5, the absolute value of the difference is 5. Further, if the number of vacant seats 15 minutes after that is 7, the absolute value of the difference is 2. In this way, the system control unit 14 calculates the difference between the numbers of vacant seats for each update interval for each set of the vacant seats number update histories having the same flight number, the same departure date and time, and the same reservation class. Then, the system control unit 14 calculates the number of changes per unit time by calculating the sum of all of the calculated absolute values of differences and dividing the sum by the number of the calculated absolute values.

Next, the system control unit 14 acquires a correction value corresponding to a day of the week of the current target date and the target time period from the change number correction value determination table (step S112). Next, the system control unit 14 adds the acquired correction value to the calculated number of changes (step S113). Next, the system control unit 14 determines whether or not the number of changes is greater than or equal to the change number threshold value stored in the storage unit 12 (step S114).

At this time, if the system control unit 14 determines that the number of changes is greater than or equal to the change number threshold value (step S114: YES), the system control unit 14 registers the current search condition, the target date, and the target time period in association with each other in the inquiry list (step S115). In other words, the estimated browsing probability is greater than or equal to the threshold value, so that the system control unit 14 acquires the number of vacant seats of an individual flight service that satisfies the current search condition, the target date, and the target time period from the GDS server 1. The system control unit 14 may calculate the number of changes for each piece of the airline ticket/vacant seat number information found in step S108, perform the determination in step S114 for each piece of the airline ticket/vacant seat number information, and register the airline ticket information included in the airline ticket/vacant seat number information where the number of changes is greater than or equal to the change number threshold value in the inquiry list. In other words, the system control unit 14 may determine whether or not to acquire the number of vacant seats from the GDS server 1 for each individual flight service instead of for each target date and target time period.

Next, the system control unit 14 determines whether or not the target time period is smaller than 23 (step S116). At this time, if the system control unit 14 determines that the target time period is smaller than 23 (step S116: YES), the system control unit 14 adds 1 to the target time period (step S117). Next, the system control unit 14 proceeds to step S107.

On the other hand, if the system control unit 14 determines that the target time period is not smaller than 23 (step S116: NO), the system control unit 14 determines whether or not the target date is a date before the last day of the week (step S118). At this time, if the system control unit 14 determines that the target date is a date before the last day of the week (step S118: YES), the system control unit 14 adds 1 to the target date (step S119). Next, the system control unit 14 proceeds to step S106.

On the other hand, if the system control unit 14 determines that the target date is not a date before the last day of the week (step S118: NO), the system control unit 14 acquires the airline ticket/vacant seat number information from the GDS server 1 based on the inquiry list (step S120). Specifically, the system control unit 14 adds the search condition, the target date, and the target time period registered in the inquiry list to the number of vacant seats inquiry message, as a condition of the airline ticket/vacant seat number information to be acquired. At this time, the system control unit 14 sets the condition for each set of the search condition, the target date, and the target time period that are associated with each other. Further, the system control unit 14 sets the target date and the target time period as a condition of the departure date and time of the airline ticket/vacant seat number information to be acquired. Here, when the airline ticket information is registered in the inquiry list, the system control unit 14 sets, for example, the flight number, the departure date and time, and the reservation class included in the airline ticket information as the condition. Next, the system control unit 14 transmits the number of vacant seats inquiry message, to the GDS server 1, in which the condition is set. In this way, the system control unit 14 performs an inquiry of the number of vacant seats for a plurality of conditions by transmitting one number of vacant seats inquiry message. The GDS server 1 searches for the airline ticket/vacant seat number information that satisfies the condition included in the received number of vacant seats inquiry message for each condition and transmits the found airline ticket/vacant seat number information to the airline ticket reservation server 3. The system control unit 14 receives the airline ticket/vacant seat number information transmitted from the GDS server 1.

Next, the system control unit 14 updates the number of vacant seats registered in the airline ticket/vacant seat number information DB 12b with the number of vacant seats included in the airline ticket/vacant seat number information acquired from the GDS server 1 (step S121). Specifically, the system control unit 14 searches the airline ticket/vacant seat number information DB 12b for the same airline ticket information as the airline ticket information included in the acquired airline ticket/vacant seat number information, and overwrites the number of vacant seats corresponding to the found airline ticket information with the number of vacant seats included in the acquired airline ticket/vacant seat number information. The system control unit 14 performs this process for each piece of the acquired airline ticket/vacant seat number information. After completing the process of step S121, the system control unit 14 ends the GDS inquiry control process.

When the system control unit 14 calculates the number of changes, the system control unit 14 may use the transaction history registered in the transaction history DB 12e. It is possible to calculate the number of changes per unit time of the number of vacant seats in the airline ticket reservation site by using the transaction history. The change number threshold value may be a fixed value regardless of the number of transactions per unit time. The system control unit 14 does not have to perform the correction of the number of changes in step S113. Further, the system control unit 14 does not have to perform the registration in the inquiry list by the determination of the number of vacant seats in step S109.

3-2. Example 2

When the airline ticket reservation server 3 according to Example 2 transmits a vacant seat calendar page to the user terminal 4, the airline ticket reservation server 3 estimates the browsing probability and acquires the number of vacant seats from the GDS server 1. The airline ticket reservation server 3 uses the number of people as the threshold value to be compared with the browsing probability. The vacant seat calendar request reception process in Example 2 is the same as that in Example 1.

Even if the number of vacant seats that is currently registered in the airline ticket/vacant seat number information DB 12b will be changed at the next update, if the change does not happen which crosses over the number of people, the number of vacant seats does not have to be changed. This is because the user only has to know whether the reservation can be made with the number of people specified by the user. Therefore, the airline ticket reservation server 3 acquires the number of vacant seats of an individual flight service where the number of vacant seats may be changed such that it crosses over the number of people at the next update from the GDS server 1. The change which crosses over the number of people includes a change of the number of vacant seats from smaller than the number of people to greater than or equal to the number of people and a change of the number of vacant seats from greater than or equal to the number of people to smaller than the number of people.

Figure 7:
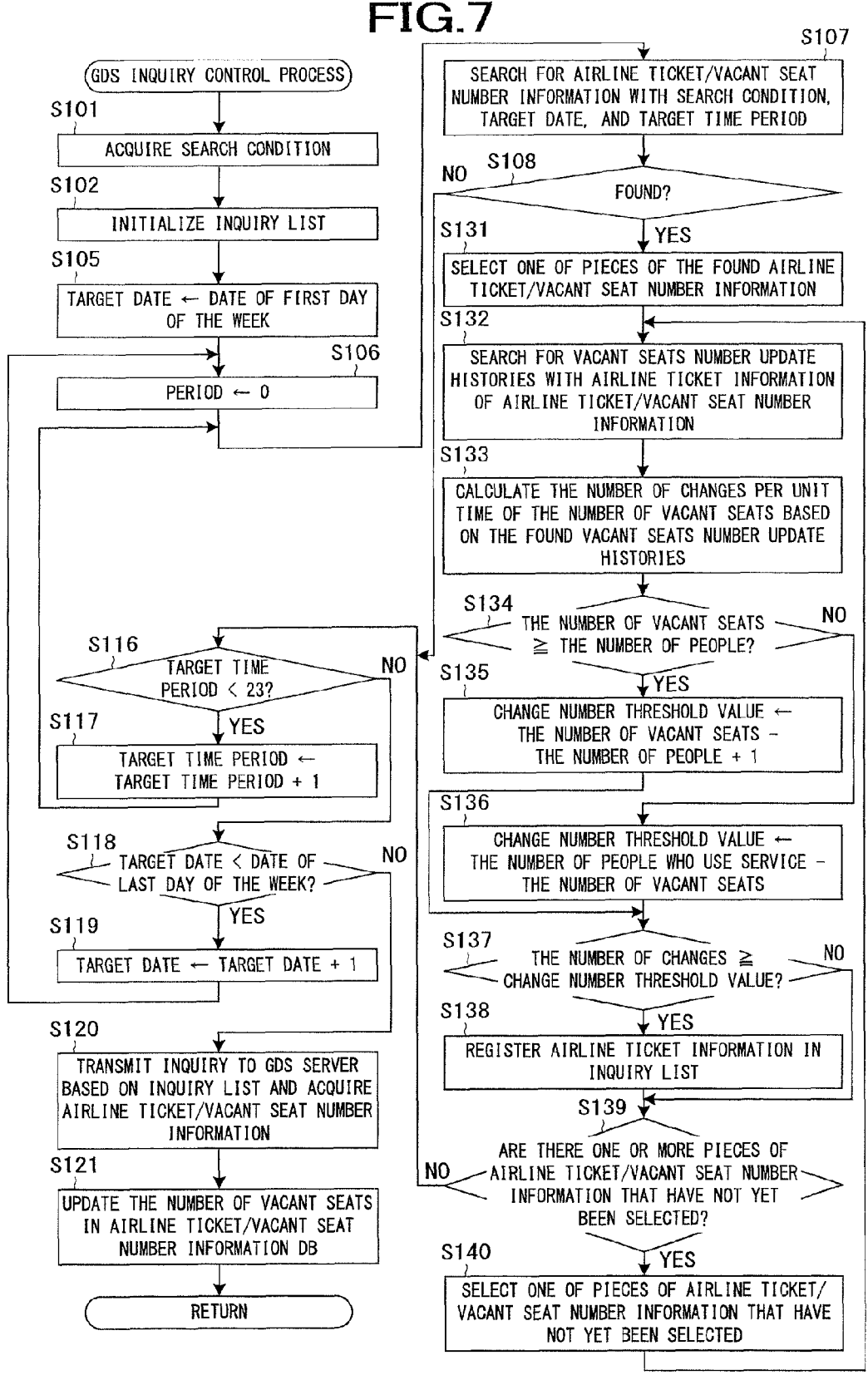
FIG. 7 is a flowchart illustrating a process example of a GDS inquiry control process in an example of the system control unit 14 of the airline ticket reservation server 3 according to the embodiment.

FIG. 7 is a flowchart illustrating a process example of the GDS inquiry control process in Example 2 of the system control unit 14 of the airline ticket reservation server 3 according to the present embodiment. In FIG. 7, the same steps as those in FIG. 6 are denoted by the same reference numerals.

The system control unit 14 performs processes of steps S101, S102, and S105 to S108. In step S108, if the system control unit 14 determines that the airline ticket/vacant seat number information is found (step S108: YES), the system control unit 14 selects one of pieces of the found airline ticket/vacant seat number information (step S131). Next, the system control unit 14 searches the vacant seat number update history DB 12c for the vacant seats number update histories whose update date and time is included in a predetermined period from among the vacant seats number update histories of an individual flight service corresponding to the selected airline ticket/vacant seat number information (step S132). Next, the system control unit 14 calculates the number of changes per unit time of the number of vacant seats based on the found vacant seats number update histories (step S133). Basic processing content of steps S132 and S133 may be the same as that in steps S110 and S111 illustrated in FIG. 6.

Next, the system control unit 14 determines whether or not the number of vacant seats included in the selected airline ticket/vacant seat number information is greater than or equal to the number of people (step S134). At this time, if the system control unit 14 determines that the number of vacant seats is greater than or equal to the number of people (step S134: YES), the system control unit 14 subtracts the number of people from the number of vacant seats and obtains the change number threshold value by adding 1 to the subtraction result (step S135). On the other hand, if the system control unit 14 determines that the number of vacant seats is not greater than or equal to the number of people (step S134: NO), the system control unit 14 subtracts the number of vacant seats from the number of people and obtains the subtraction result as the change number threshold value (step S136).

Next, the system control unit 14 determines whether or not the number of changes is greater than or equal to the calculated change number threshold value (step S137). At this time, if the system control unit 14 determines that the number of changes is greater than or equal to the change number threshold value (step S137: YES), the system control unit 14 registers the airline ticket information included in the selected airline ticket/vacant seat number information in the inquiry list (step S138). Next, the system control unit 14 proceeds to step S139. On the other hand, if the system control unit 14 determines that the number of changes is smaller than the change number threshold value (step S137: NO), the system control unit 14 proceeds to step S139.

In step S139, the system control unit 14 determines whether or not there are one or more pieces of the airline ticket/vacant seat number information that have not yet been selected among pieces of the found airline ticket/vacant seat number information. At this time, if the system control unit 14 determines that there are one or more pieces of the airline ticket/vacant seat number information that have not yet been selected (step S139: YES), the system control unit 14 selects one of pieces of the airline ticket/vacant seat number information that have not yet been selected (step S140). Next, the system control unit 14 proceeds to step S132. On the other hand, if the system control unit 14 determines that all pieces of the airline ticket/vacant seat number information have been selected (step S139: NO), the system control unit 14 proceeds to step S116. The process of steps S116 to S121 is the same as that in Example 1.

3-3. Example 3

The airline ticket reservation server 3 according to Example 3 estimates the browsing probability and acquires the number of vacant seats from the GDS server 1 after inquiring of the GDS server 1 about vacant seats when a user selects the vacant seat inquiry button on the individual flight service list page. Further, the airline ticket reservation server 3 corrects the browsing probability based on the attribute of an individual flight service to be inquired.

When realizing that there are vacant seats of which the number is greater than or equal to the number of people after vacant seats are inquired, the user may makes a reservation. In this case, the user may not browse the information of the individual flight service any more. If the user does not browse information, it is not necessary to acquire the latest number of vacant seats. On the other hand, when realizing that the number of vacant seats is smaller than the specified number of people, the user may display the vacant seat calendar page by selecting the vacant seat calendar return button and see information of an individual flight service in a time period different from the time period specified previously. In this case, it is preferable to acquire the latest number of vacant seats of an individual flight service whose information that the user is expected to see from the GDS server 1. Therefore, the system control unit 14 estimates the browsing probability and acquires the number of vacant seats from the GDS server 1 according to whether or not there are vacant seats of which the number is greater than or equal to the number of people. Thereby, if it is found that there are enough vacant seats, it is only necessary to inquire of the GDS server 1 about the vacant seat status, so that it is possible to reduce the time required for the inquiry.

Figure 8:
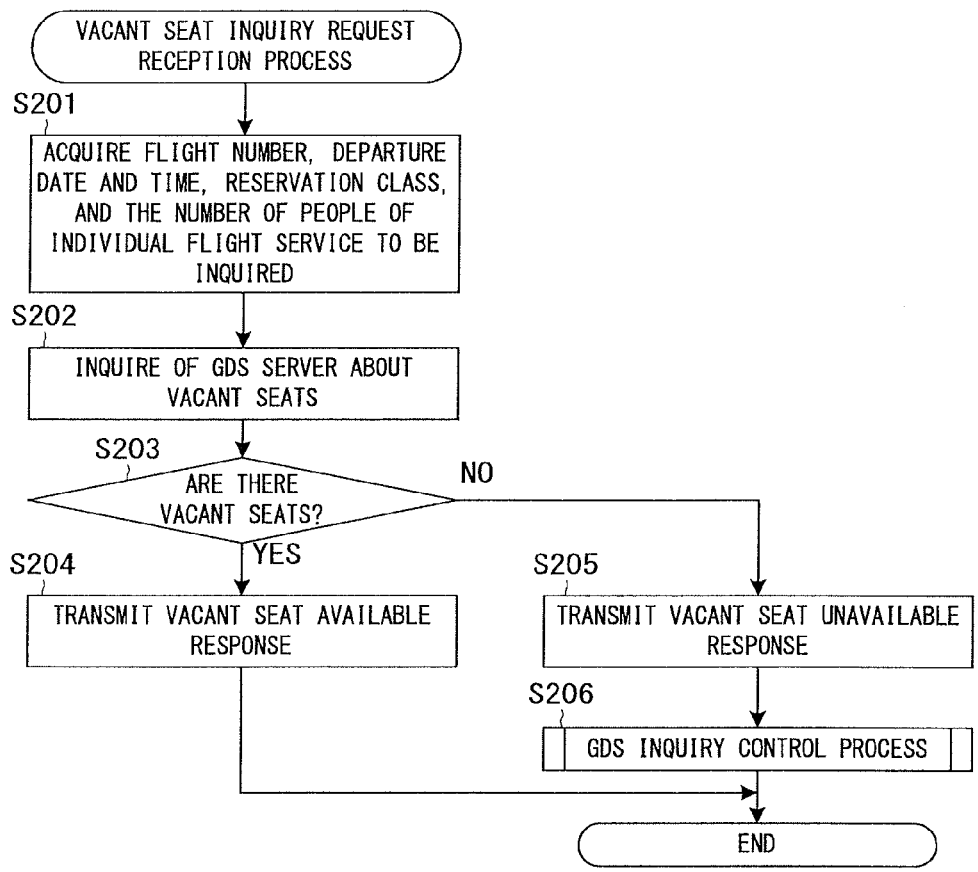
FIG. 8 is a flowchart illustrating a process example of a vacant seat inquiry request reception process in an example of the system control unit 14 of the airline ticket reservation server 3 according to the embodiment.

FIG. 8 is a flowchart illustrating a process example of a vacant seat inquiry request reception process in Example 3 of the system control unit 14 of the airline ticket reservation server 3 according to the present embodiment.

When a user selects the vacant seat inquiry button on the individual flight service list page, the user terminal 4 transmits a vacant seat inquiry request including the flight number, the departure date and time, and the reservation class of an individual flight service corresponding to the selected vacant seat inquiry button and information for identifying a search condition specified by the user in advance to the airline ticket reservation server 3. The vacant seat inquiry request reception process is started when the airline ticket reservation server 3 receives the vacant seat inquiry request.

First, the system control unit 14 acquires the flight number, the departure date and time, the reservation class, and the number of people corresponding to the received vacant seat inquiry request (step S201). Next, the system control unit 14 inquires of the GDS server 1 about vacant seats (step S202). Specifically, the system control unit 14 transmits a vacant seat reference inquiry message including the acquired flight number, departure date and time, reservation class, and number of people to the GDS server 1. The GDS server 1 searches for the airline ticket/vacant seat number information with the flight number, the departure date and time, and the reservation class included in the received vacant seat reference inquiry message, and acquires the number of vacant seats from the found airline ticket/vacant seat number information. Then, the GDS server 1 determines whether or not the number of vacant seats is greater than or equal to the number of people included in the vacant seat reference inquiry message, and transmits the determination result to the airline ticket reservation server 3 as a vacant seat reference response.

When the system control unit 14 receives the vacant seat reference response from the GDS server 1, the system control unit 14 determines whether or not there are vacant seats of which the number is greater than or equal to the number of people (step S203). At this time, if the system control unit 14 determines that there are vacant seats of which the number is greater than or equal to the number of people (step S203: YES), the system control unit 14 transmits a vacant seat available response to the user terminal 4 (step S204). After completing this process, the system control unit 14 ends the vacant seat inquiry request reception process. When the user terminal 4 receives the vacant seat available response, the user terminal 4 displays a message indicating that there are vacant seats, and a reservation button on the individual flight service list page. After completing this process, the system control unit 14 ends the vacant seat inquiry request reception process.

On the other hand, if the system control unit 14 determines that there are not vacant seats of which the number is greater than or equal to the number of people (step S203: NO), the system control unit 14 transmits a vacant seat unavailable response to the user terminal 4 (step S205). When the user terminal 4 receives the vacant seat unavailable response, the user terminal 4 displays a message indicating that there are no vacant seats on the individual flight service list page. Next, the system control unit 14 performs the GDS inquiry control process (step S206). After completing this process, the system control unit 14 ends the vacant seat inquiry request reception process.

Thereafter, when the user selects the vacant seat calendar return button, the user terminal 4 transmits a vacant seat calendar request to the airline ticket reservation server 3. Accordingly, the system control unit 14 waits for completion of the GDS inquiry control process performed in step S206 and thereafter performs the vacant seat calendar request reception process and causes the user terminal 4 to display the vacant seat calendar page. On the vacant seat calendar page, the vacant seat status of an individual flight service where the browsing probability is determined to be greater than or equal to the threshold value in the GDS inquiry control process reflects the latest number of vacant seats acquired from the GDS server 1. On the other hand, the vacant seat status of an individual flight service where the browsing probability is determined to be not greater than or equal to the threshold value reflects the number of vacant seats that has been registered in the airline ticket/vacant seat number information DB 12b since before the GDS inquiry control process was performed.

Figure 9:
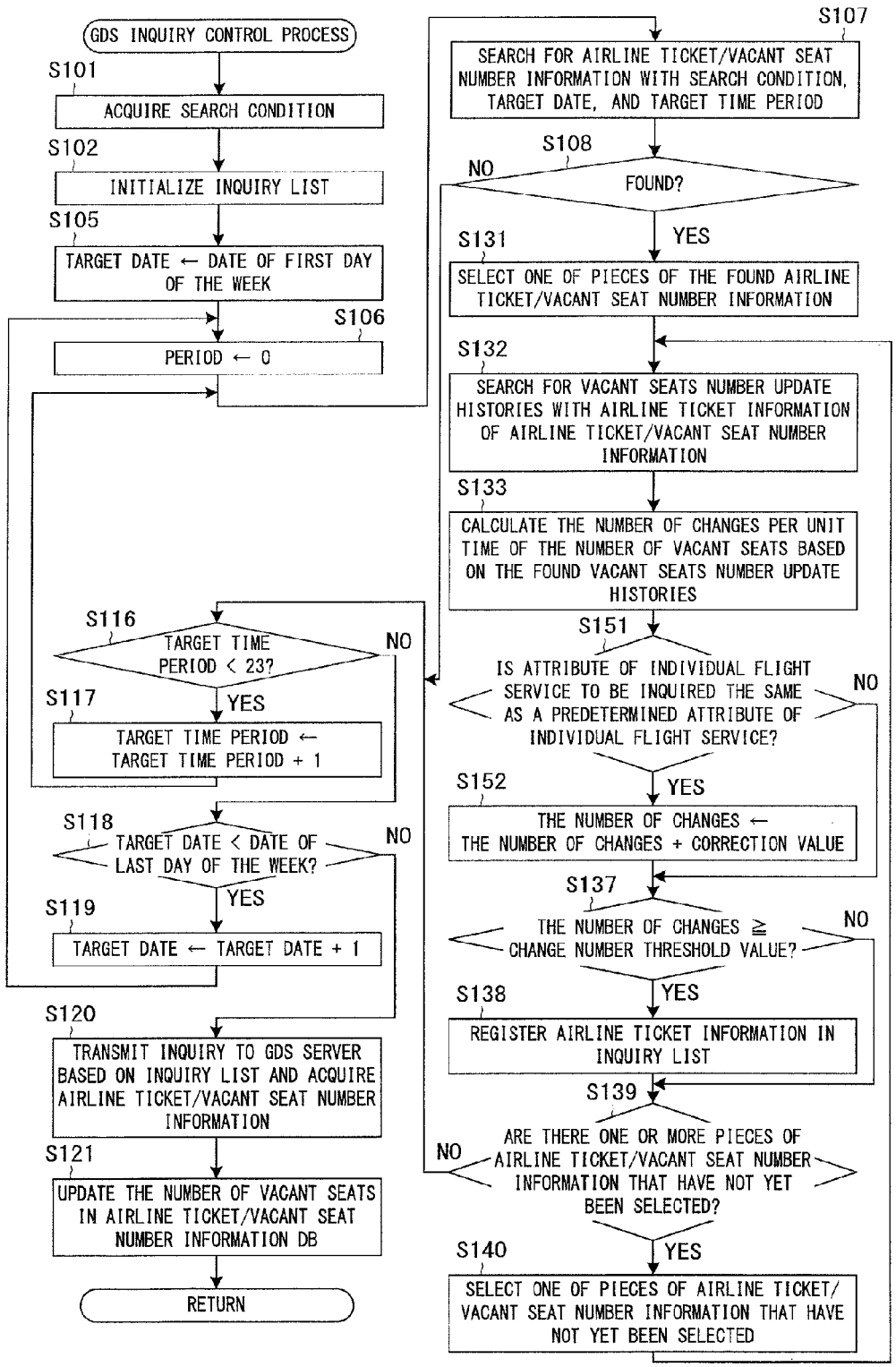
FIG. 9 is a flowchart illustrating a process example of a GDS inquiry control process in an example of the system control unit 14 of the airline ticket reservation server 3 according to the embodiment.

FIG. 9 is a flowchart illustrating a process example of the GDS inquiry control process in Example 3 of the system control unit 14 of the airline ticket reservation server 3 according to the present embodiment. In FIG. 9, the same steps as those in FIG. 7 are denoted by the same reference numerals.

The system control unit 14 performs processes of steps S101, S102, S105 to S108, and S131 to S133. Next, the system control unit 14 compares a predetermined attribute of an individual flight service corresponding to the selected airline ticket/vacant seat number information and the attribute of an individual flight service where vacant seats are inquired, and determines whether or not the attributes are within the same attribute range (step S151). Here, the system control unit 14 acquires, from the airline ticket/vacant seat number information DB 12b, the selected airline ticket/vacant seat number information and the airline ticket information of the individual flight service where vacant seats are inquired and performs the determination based on the attributes included in the airline ticket information. For example, the system control unit 14 determines whether or not the fare of the individual flight service corresponding to the selected airline ticket/vacant seat number information and the fare of the individual flight service where vacant seats are inquired are included in the same price range.

At this time, if the system control unit 14 determines that the predetermined attribute of the individual flight service corresponding to the selected airline ticket/vacant seat number information is not within the same range as that of the attribute of the individual flight service where vacant seats are inquired (step S151: NO), the system control unit 14 proceeds to step S137.

On the other hand, if the system control unit 14 determines that the predetermined attribute of the individual flight service corresponding to the selected airline ticket/vacant seat number information is within the same range as that of the attribute of the individual flight service where vacant seats are inquired (step S151: YES), the system control unit 14 adds a correction value stored in the storage unit 12 to the calculated number of changes (step S152). In other words, the system control unit 14 calculates the browsing probability so that the browsing probability increases. This is because it is assumed that after the user inquired vacant seats of a certain individual flight service, it is highly probable that the user refers to information related to an individual flight service similar to the individual flight service where the user inquired vacant seats. The system control unit 14 may determine the correction value by a price difference between the fare of the individual flight service corresponding to the selected airline ticket/vacant seat number information and the fare of the individual flight service where vacant seats are inquired instead of correcting the number of changes according to whether or not the fare of the individual flight service corresponding to the selected airline ticket/vacant seat number information and the fare of the individual flight service where vacant seats are inquired are included in the price range. Specifically, the system control unit 14 may determine the correction value so that the smaller the price difference is, the greater the correction value is. After completing this process, the system control unit 14 proceeds to step S137. The processes of steps S137 to S140 and S116 to S121 are the same as those in Example 2.

The attribute used in the determination is step S151 is not limited to the attribute described above. For example, it is possible to use conditions identified by such as the departure airport, the arrival airport, the morning departure, the afternoon departure, the direct flight or indirect flight, the seat class, and the reservation class.

The system control unit 14 may determine the browsing probability based on only an attribute of an individual flight service instead of determining the browsing probability based on the attribute of an individual flight service and the number of changes per unit time of the number of vacant seats.

The system control unit 14 may transmit a request of reservation with the number of people specified by the user to the GDS server 1 in order to make a reservation of an individual flight service requested by the user, and perform the GDS inquiry control process if receiving a response indicating that the reservation cannot made from the GDS server 1.

3-4. Example 4

The airline ticket reservation server 3 according to Example 4 estimates the browsing probability before inquiring of the GDS server 1 about the number of vacant seats and acquires the number of vacant seats from the GDS server 1 when inquiring of the GDS server 1 about the number of vacant seats.

In Example 3, if the vacant seat calendar page is redisplayed after it is found that there are not the vacant seats, inquiry is transmitted to the GDS server 1 two times. Besides the number of individual flight services to be an inquiry target, if the response time from the GDS server 1 per inquiry is long, the waiting time of the user increases.

Therefore, it is accepted to inquire about whether or not the number of vacant seats of an individual flight service of the inquiry target is greater than or equal to the number of people and the number of vacant seats of an individual flight service where the browsing probability is greater than or equal to the threshold value at the same time by one-time transmission of an inquiry message.

Figure 10:
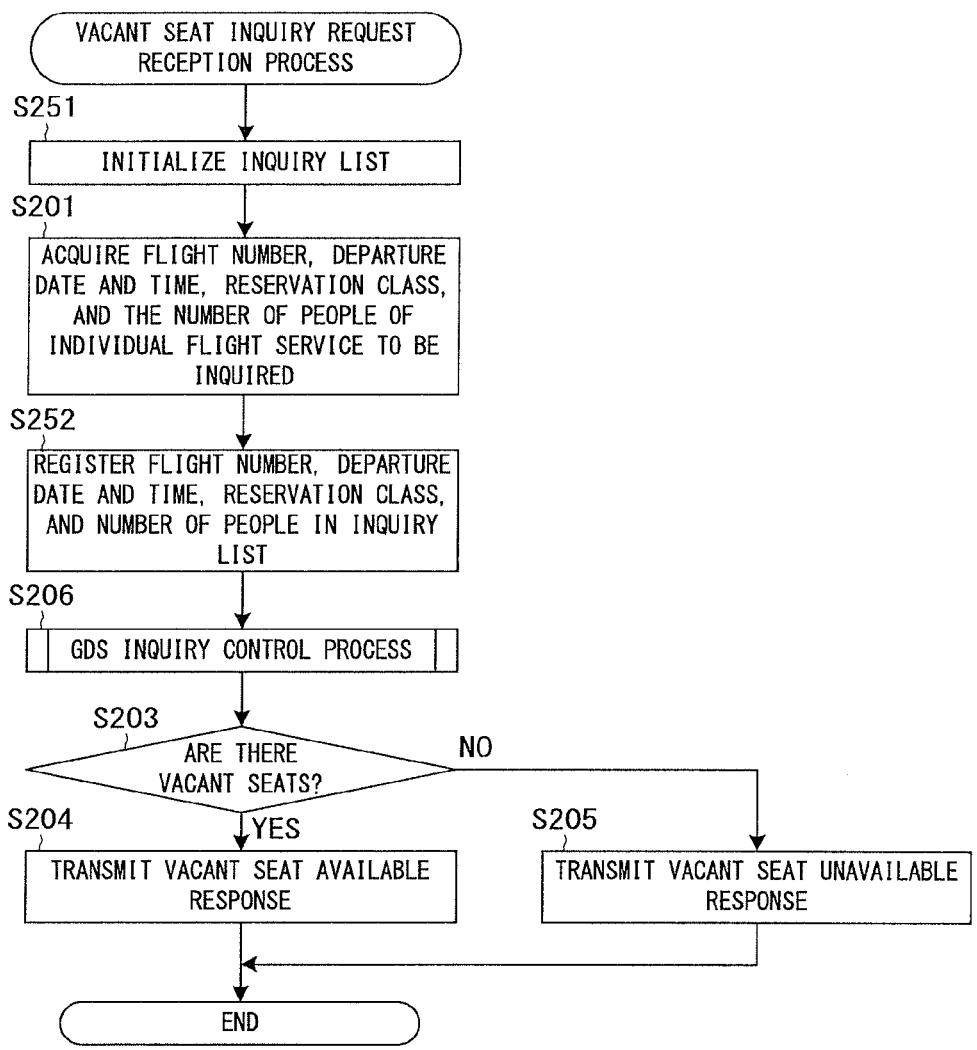
FIG. 10 is a flowchart illustrating a process example of a vacant seat inquiry request reception process in an example of the system control unit 14 of the airline ticket reservation server 3 according to the embodiment.

FIG. 10 is a flowchart illustrating a process example of a vacant seat inquiry request reception process in Example 4 of the system control unit 14 of the airline ticket reservation server 3 according to the present embodiment. In FIG. 10, the same steps as those in FIG. 8 are denoted by the same reference numerals.

First, the system control unit 14 initializes an inquiry list (step S251). Next, the system control unit 14 acquires the flight number, the departure date and time, the reservation class, and the number of people (step S201) and registers these in the inquiry list in association with each other (step S252). Next, the system control unit 14 performs the GDS inquiry control process (step S206). Processing content of the GDS inquiry control process is basically the same as that in Example 3. However, the system control unit 14 does not perform the initialization of the inquiry list, which is performed in step S102 illustrated in FIG. 9. In step S120, the system control unit 14 acquires information whether or not the number of vacant seats of an individual flight service of the inquiry target is greater than or equal to the number of people and the number of vacant seats of an individual flight service where the browsing probability is greater than or equal to the threshold value at the same time by one-time transmission of an inquiry message.

After completing the GDS inquiry control process, the system control unit 14 transmits a response to the user terminal 4 according to the response result from the GDS server 1 (steps S203 to S205).

3-5. Example 5

The airline ticket reservation server 3 according to Example 5 estimates the browsing probability and acquires the number of vacant seats from the GDS server 1 after transmitting an individual flight service list page to the user terminal 4. The airline ticket reservation server 3 uses a conditional selection probability of each period in the vacant seat calendar page as the browsing probability.

Figure 11:
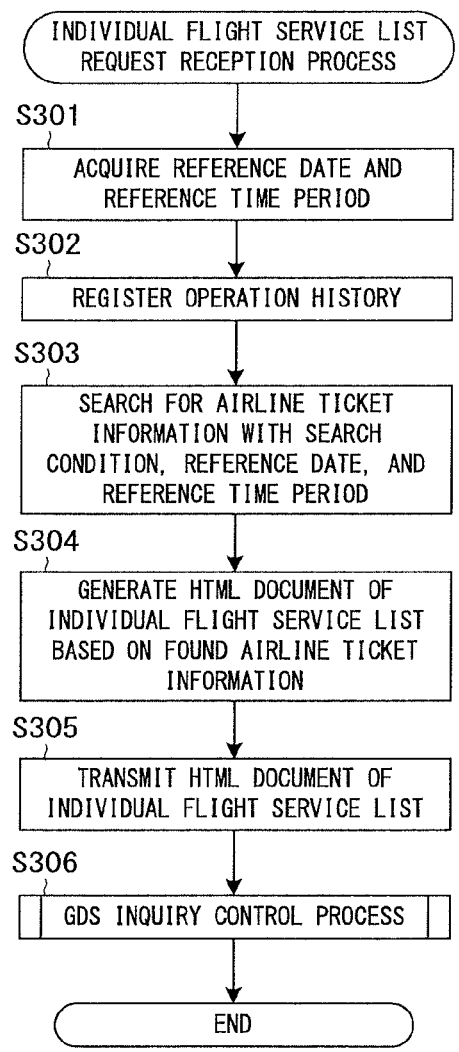
FIG. 11 is a flowchart illustrating a process example of an individual flight service list request reception process in an example of the system control unit 14 of the airline ticket reservation server 3 according to the embodiment.

FIG. 11 is a flowchart illustrating a process example of an individual flight service list request reception process in Example 5 of the system control unit 14 of the airline ticket reservation server 3 according to the present embodiment.

When a user selects "◯" displayed in a certain period in the vacant seat calendar page, the user terminal 4 transmits an individual flight service list request including information of the date and time period corresponding to the selected period and information for identifying a search condition specified by the user in advance to the airline ticket reservation server 3. The individual flight service list request reception process is started when the airline ticket reservation server 3 receives the individual flight service list request.

First, the system control unit 14 acquires the date and the time period included in the received individual flight service list request as a reference date and a reference time period and acquires a search condition corresponding to the individual flight service list request (step S301). Next, the system control unit 14 acquires the user ID of the user of the user terminal 4 that transmits the request from the session management and registers the acquired user ID, a day of the week corresponding to the reference date, and the reference time period in the operation history DB 12*f*. At this time, the system control unit 14 registers the current date and time as an operation date and time (step S302).

Next, the system control unit 14 searches the airline ticket/vacant seat number information DB 12*b* for the airline ticket/vacant seat number information with the acquired search condition, the reference date, and the reference time period (step S303). At this time, the system control unit 14 searches for the airline ticket/vacant seat number information where the number of vacant seats is greater than or equal to the number of people. Next, the system control unit 14 generates an HTML document of an individual flight service list page based on the found airline ticket/vacant seat number information (step S304). Next, the system control unit 14 transmits the generated HTML document to the user terminal 4 (step S305).

Next, the system control unit 14 performs a GDS inquiry control process described later (step S306). After completing this process, the system control unit 14 ends the individual flight service list request reception process.

Figure 12:
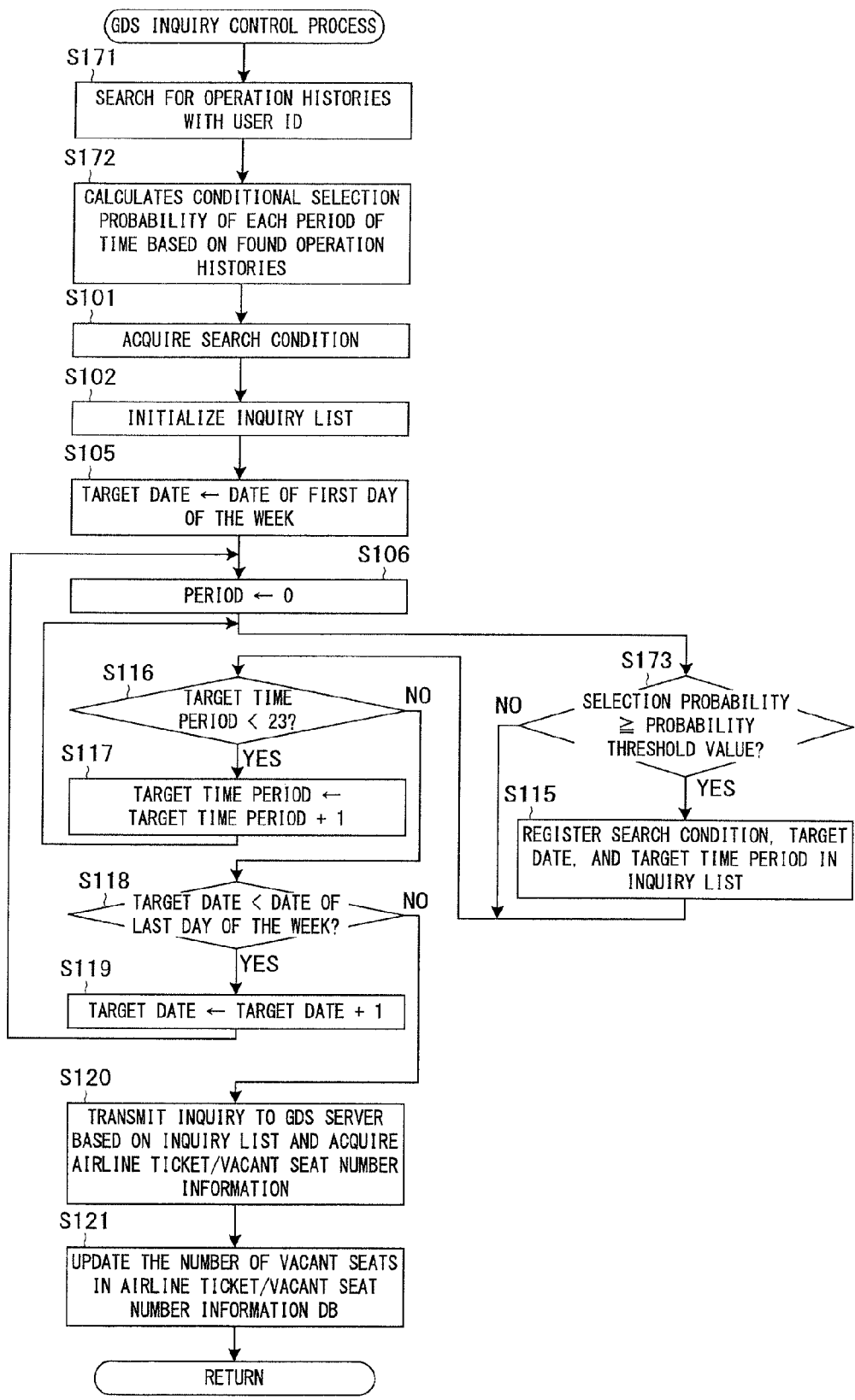
FIG. 12 is a flowchart illustrating a process example of a GDS inquiry control process in an example of the system control unit 14 of the airline ticket reservation server 3 according to the embodiment.

FIG. 12 is a flowchart illustrating a process example of the GDS inquiry control process in Example 5 of the system control unit 14 of the airline ticket reservation server 3 according to the present embodiment. In FIG. 12, the same steps as those in FIG. 6 are denoted by the same reference numerals.

First, the system control unit 14 acquires the user ID of the user of the user terminal 4 that transmits the request from the session management and searches the operation history DB 12*f* for operation histories that includes the acquired user ID (step S171).

Next, the system control unit 14 calculates, based on the found histories, the selection probability of each period under a condition that the reference time period of a day of the week of the reference date is selected (step S172). Specifically, the system control unit 14 generates the selection time number table for storing the number of selection times of each period, and initializes the number of selection times of each period to 0. Next, the system control unit 14 sorts the found operation histories in ascending order of the operation date and time. Next, the system control unit 14 searches for operation histories, in ascending order of the operation date and time, where the selected day of the week and the selected time period correspond to a day of the week of the reference date and the reference time period. Next, the system control unit 14 acquires a selected day of the week and a selected time period from an operation history one step newer than the found operation history. Next, the system control unit 14 adds 1 to the number of selection times corresponding to the found selected day of the week and selected time period. The system control unit 14 repeatedly performs this process until the operation histories where the selected day of the week and the selected time period correspond to a day of the week of the reference date and the reference time period disappear. Next, the system control unit 14 calculates the conditional probability of each period by dividing the number of selection times of each period by the number of operation histories where the selected day of the week and the selected time period correspond to a day of the week of the reference date and the reference time period.

Next, the system control unit 14 performs processes of steps S101 S102, S105, and S106. Next, the system control unit 14 determines whether or not the selection probability of the target time period on the current target day of the week is greater than or equal to a probability threshold value stored in the storage unit 12 (step S173). At this time, if the system control unit 14 determines that the selection probability is greater than or equal to the probability threshold value (step S173: YES), the system control unit 14 registers the current condition, the target date, and the target time period in association with each other in the inquiry list (step S115). Next, the system control unit 14 proceeds to step S116. On the other hand, if the system control unit 14 determines that the selection probability is not greater than or equal to the probability threshold value (step S173: NO), the system control unit 14 proceeds to step S116. Thereafter, the system control unit 14 performs processes of steps S116 to S119. In this way, the system control unit 14 registers the periods where the selection probability is greater than or equal to the probability threshold value in the inquiry list. Then, the system control unit 14 performs the processes of steps S120 and S121 and ends the GDS inquiry control process.

The system control unit 14 calculates the selection probability based on the operation histories of the user who performs the selection operation on the vacant seat calendar page. Instead of it, the system control unit 14 may calculate the selection probability based on the operation histories of all users. The system control unit 14 may take account of the selection probability of the user performing selection and the selection probability of all users. For example, the system control unit 14 may compare a value obtained by adding the selection probability of the user performing selection and the selection probability of all users and dividing the addition result by 2 with the probability threshold value.

3-6. Operation of Reservation and Cancellation

Next, an operation of reserving airline tickets and an operation of cancelling airline tickets will be described. The processes described below can be performed in any one of Examples 1 to 5.

When airline tickets are reserved or cancelled on the airline ticket reservation site, the content of the reservation or the cancellation can be reflected on the number of vacant seats registered in the airline ticket/vacant seat number information DB 12*b*. Thereby, the airline ticket reservation server 3 can approximate the number of vacant seats registered in the airline ticket/vacant seat number information DB 12*b* to the latest number of vacant seats managed by the GDS server 1.

Figure 13A:
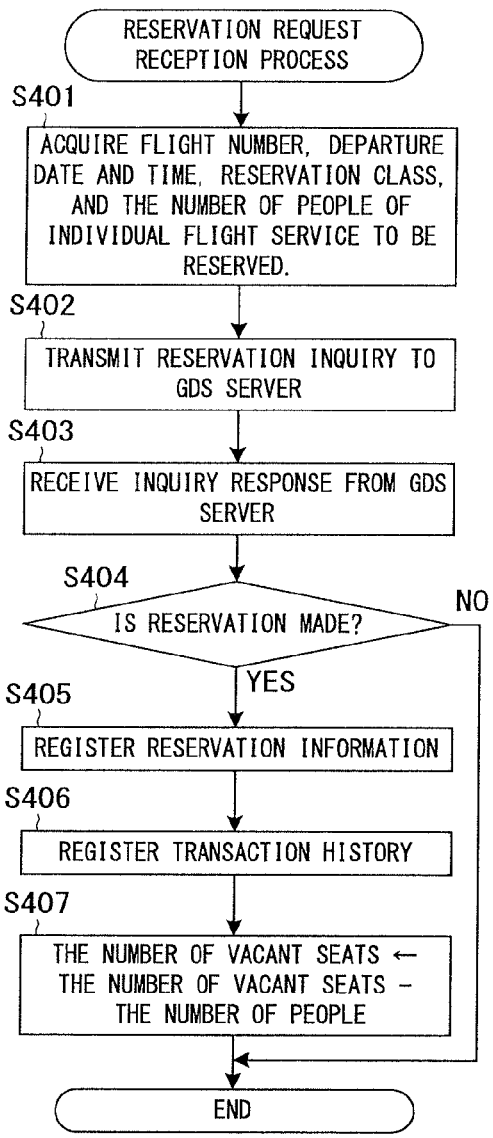
FIG. 13A is a flowchart illustrating a process example of a reservation request reception process of the system control unit 14 of the airline ticket reservation server 3 according to the embodiment.

FIG. 13A is a flowchart illustrating a process example of a reservation request reception process of the system control unit 14 of the airline ticket reservation server 3 according to the present embodiment.

When a user selects an individual flight service and inputs information necessary to make a reservation, the user terminal 4 transmits a reservation request including information for identifying the flight number, the departure date and time, the reservation class, and the number of people of the selected individual flight service to the airline ticket reservation server 3. The reservation request reception process is started when the airline ticket reservation server 3 receives the reservation request.

First, the system control unit 14 acquires the flight number, the departure date and time, the reservation class, and the number of people of a reservation target corresponding to the received reservation request (step S401). Next, the system control unit 14 transmits a reservation inquiry message including the acquired information and a newly generated reservation number to the GDS server 1 (step S402). The GDS server 1 searches for the airline ticket/vacant seat number information with the flight number, the departure date and time, and the reservation class included in the received reservation inquiry message, and acquires the number of vacant seats from the found airline ticket/vacant seat number information. Then, the GDS server 1 determines whether or not the number of vacant seats is greater than or equal to the number of people included in the reservation inquiry message and performs a reservation process if the number of vacant seats is greater than or equal to the number of people. Then, the GDS server 1 transmits a reservation inquiry response including a processing result to the airline ticket reservation server 3.

When the system control unit 14 receives the reservation inquiry response (step S403), the system control unit 14 determines whether or not the reservation can be made based on the reservation inquiry response (step S404). At this time, if the system control unit 14 determines that the reservation cannot be made (step S404: NO), the system control unit 14 transmits a vacant seat unavailable response to the user terminal 4 and ends the reservation request reception process.

On the other hand, if the system control unit 14 determines that the reservation can be made (step S404: YES), the system control unit 14 registers reservation information in the reservation information DB 12d (step S405). Next, the system control unit 14 registers a transaction history in the transaction history DB 12e (step S406). Next, the system control unit 14 searches the airline ticket/vacant seat number information DB 12b for the airline ticket/vacant seat number information including the flight number, the departure date and time, and the reservation class of the reservation target and subtracts the number of people from the number of vacant seats included in the found airline ticket/vacant seat number information. After completing this process, the system control unit 14 ends the reservation request reception process.

Figure 13B:
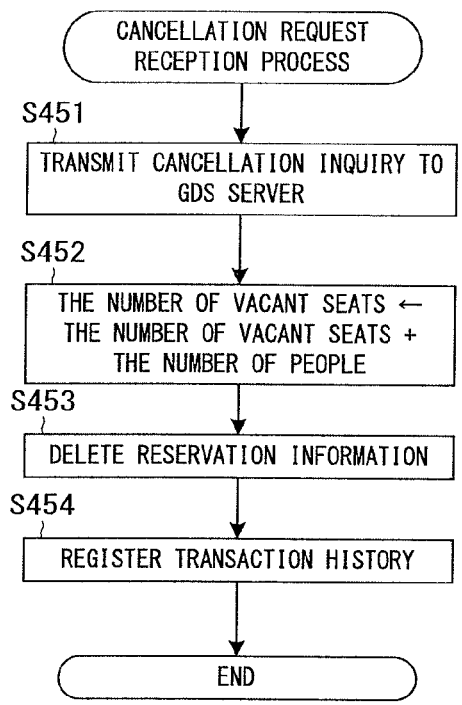
FIG. 13B is a flowchart illustrating a process example of a cancellation request reception process of the system control unit 14 of the airline ticket reservation server 3 according to the embodiment.

FIG. 13B is a flowchart illustrating a process example of a cancellation request reception process of the system control unit 14 of the airline ticket reservation server 3 according to the present embodiment.

When a user performs an operation to select a reservation number of a reservation which the user wants to cancel, the user terminal 4 transmits a cancellation request including the selected reservation number to the airline ticket reservation server 3. The cancellation request reception process is started when the airline ticket reservation server 3 receives the cancellation request.

First, the system control unit 14 transmits a cancellation inquiry message including the reservation number included in the received cancellation request to the GDS server 1 (step S451). The GDS server 1 performs a process to cancel the reservation corresponding to the reservation number included in the received cancellation inquiry message.

Next, the system control unit 14 searches the reservation information DB 12d for reservation information corresponding to the reservation number, and searches the airline ticket/vacant seat number information DB 12b for the airline ticket/vacant seat number information including airline ticket information included in the found reservation information. Next, the system control unit 14 adds the number of people included in the found reservation information to the number of vacant seats included in the found airline ticket/vacant seat number information (step S452).

Next, the system control unit 14 deletes the found reservation information from the reservation information DB 12d (step S453). Next, the system control unit 14 registers a transaction history in the transaction history DB 12e (step S454). After completing this process, the system control unit 14 ends the cancellation request reception process.

As described above, according to the present embodiment, the system control unit 14 of the airline ticket reservation server 3 registers the number of vacant seats of an individual flight service in the airline ticket/vacant seat number information DB 12b for each individual flight service identified by the flight number, the reservation class, and the departure date and time based on the number of vacant seats periodically acquired from the GDS server 1, estimates the probability that information related to an individual flight service is browsed by a user for each of a plurality of individual flight services corresponding to a request of the user, acquires the numbers of vacant seats of the individual flight services where the estimated probability is greater than or equal to the threshold value from the GDS server 1, acquires the numbers of vacant seats of the individual flight services where the estimated probability is smaller than the threshold value from the airline ticket/vacant seat number information DB 12b, and provides a vacant seat status of each of a plurality of individual flight services corresponding to the acquired numbers of vacant seats. Therefore, it is possible to make a state of available spots of individual flight services whose information is required by the user as new as possible and provide the state while reducing the number of individual flight services where the number of vacant seats is acquired from the GDS server 1.

Further, the system control unit 14 acquires the number of changes per predetermined time of the number of vacant seats of each of a plurality of individual flight services corresponding to a request of the user and estimates a probability according to the acquired number of changes, so that it is possible to estimate the probability that information is browsed by the user by using the number of changes per predetermined time of the number of vacant seats.

Further, the system control unit 14 acquires a correction value corresponding to a time period including a departure date and time of an individual flight service for each of a plurality of individual flight services corresponding to a request of the user from the change number correction value determination table which stores a correction value that corrects the number of changes for each of a plurality of time periods included in one week and corrects the probability based on the acquired number of changes and the acquired correction information, so that if the browsing frequency of information of the user is different according to on a day of the week and a time period in which an individual flight service departs, it is possible to improve the estimation accuracy of the probability that the information is browsed by the user by setting a correction value according to the browsing frequency.

Further, the system control unit 14 determines a threshold value corresponding to each individual flight service according to a difference between the number of vacant seats of each of a plurality of individual flight services registered in the airline ticket/vacant seat number information DB 12b and the number of people. Therefore, it is possible to estimate whether or not the number of vacant seats changes to exceed or fall below the number of people.

Further, the system control unit 14 calculates the number of transactions of an individual flight service per predetermined time for each of a plurality of time periods included in one week based on transaction histories registered in the transaction history DB 12e and determines a threshold value according to the number of transactions in a time period including a period in which the request of the user is received among the calculated numbers of transactions so that the greater the number of transactions is, the smaller the threshold value is. Therefore, it is possible to improve the estimation accuracy of the probability that the information is browsed by the user.

Further, the system control unit 14 provides the vacant seat statuses of a plurality of individual flight services provided in a predetermined period corresponding to a request of the user for each of a plurality of time periods included in a predetermine week, identifies a time period specified as a time period in which information related to an individual flight service is browsed by the user from among a plurality of time periods, and estimates a probability that a time period is specified next time under a condition in which the identified time period has been specified for each of a plurality of time periods based on operation histories registered in the operation history DB 12f. Therefore, it is possible to estimate a probability that the user browses information related to an individual flight service.

Further, the system control unit 14 identifies an individual flight service specified as an individual flight service where information related to the individual flight service is browsed by the user from among a plurality of individual flight services corresponding to a request of the user, acquires an attribute of the identified individual flight service and an attribute of each of a plurality of individual flight services according to the request of the user from the airline ticket/vacant seat number information DB 12b, compares the attribute of the identified individual flight service and the attribute of each of the plurality of individual flight services, and estimates a probability that the user browses information of an individual flight service based on the comparison result. Therefore, for each of a plurality of individual flight services, it is possible to estimate a probability that information is browsed after information related to a certain individual flight service is browsed.

Further, the system control unit 14 identifies an individual flight service where an inquiry of the vacant seat status is requested by the user from among a plurality of individual flight services corresponding to a request of the user, acquires a vacant seat reference response from the GDS server 1 as the vacant seat status of the identified individual flight service, and further acquires the number of vacant seats of an individual flight service where the estimated probability is greater than or equal to the threshold value from the GDS server 1 when the number of vacant seats of the identified individual flight service is smaller than the number of people based on the acquired vacant seat reference response. Therefore, it is possible to reduce the number of individual flight services where the vacant seat status is acquired from the GDS server 1.

Further, the system control unit 14 identifies an individual flight service where an inquiry of the vacant seat status is requested by the user from among a plurality of individual flight services corresponding to a request of the user and acquires the number of vacant seats of an individual flight service where the estimated probability is greater than or equal to the threshold value and the vacant seat status of the identified individual flight service from the GDS server 1 based on a one-time inquiry request, so that it is possible to reduce the time required to complete the acquisition of the number of vacant seats when the number of vacant seats of an individual flight service where an inquiry of the number of vacant seats is requested is smaller than the number of people.

Further, the system control unit 14 receives a reservation request and a cancellation request from a terminal device and updates the number of vacant seats registered in the airline ticket/vacant seat number information DB 12b based on the received request, so that it is possible to approximate the vacant seat status of an individual flight service where the number of vacant seats is not acquired from the GDS server 1 to the latest vacant seat status.

Further, the system control unit 14 acquires the numbers of vacant seats of individual flight services where the estimated probability is greater than or equal to the threshold value and individual flight services where the number of vacant seats registered in the airline ticket/vacant seat number information DB 12b is smaller than the number of people among a plurality of individual flight services corresponding to a request of the user from the GDS server 1, so that it is possible to increase the chances to make a reservation.

In the embodiment described above, the present invention is applied to a case in which the vacant seat status is displayed in a calendar format as a providing form of the vacant seat status. However, the present invention may be applied to a providing form other than the case in which the vacant seat status is displayed in a calendar format.

In the embodiments described above, the management apparatus of the present invention is applied to a server device that belongs to GDS. However, it is not limited to GDS or CRS (Computer Reservation System).

In the embodiments described above, the present invention is applied to reservation of airline tickets. However, the present invention can be applied to, for example, reservation of seats of a transportation system other than airplane, such as train, bus, and ocean liner, reservation of an accommodation facility, and reservation of an athletic facility such as a golf course.

REFERENCE SIGNS LIST

1 GDS server
2 Airline company terminal
3 Airline ticket reservation server
4 User terminal
11 Communication unit
12 Storage unit
12a Member information DB
12b Airline ticket/vacant seat number information DB
12c Vacant seat number update history DB
12d Reservation information DB
12e Transaction history DB
12f Operation history DB
13 Input/output interface
14 System control unit 14a CPU
14b ROM
14c RAM
15 System bus
NW Network
S Airline ticket reservation system

The invention claimed is:

1. An information providing apparatus comprising:
at least one memory operable to store program code;
at least one processor operable to read the program code and operate as instructed by the program code, the program code including:
control code configured to cause the at least one processor to cache, based on a number of available spots of a service which is periodically acquired from a management apparatus that manages numbers of available spots of services, a number of available spots of a reservation target in a cache for each reservation target, wherein the reservation target is identified by a combination of a type of a service and a time of using the service;
estimation code configured to cause the at least one processor to estimate, for each of a plurality of reservation targets corresponding to a request received from a terminal of a user, a probability that information related to the reservation target is browsed by the terminal of the user based on a number of changes, per predetermined time, to the number of available spots of each of the plurality of reservation targets;
code configured to cause the at least one processor to, in response to the probability estimated by the estimation code being greater than or equal to a threshold value, access the management apparatus and transmit, to the terminal of the user, information about available spots of the reservation target obtained from the management apparatus; and
code configured to cause the at least one processor to, in response to the probability estimated by the estimation code being smaller than the threshold value, access the cache and transmit, to the terminal of the user, the information about available spots of the reservation target obtained from the cache,
wherein a time to obtain the information about available spots of the reservation target by accessing the cache is reduced compared with a time to obtain the information about available spots of the reservation target by accessing the management apparatus.

2. The information providing apparatus according to claim 1, wherein the program code further comprises:
correction information acquisition code configured to cause the at least one processor to acquire, from a correction information storage configured to store correction information for correcting the number of changes for each of a plurality of periods included in a predetermined unit period, the correction information corresponding to a period including a time of providing a reservation target for each of the plurality of reservation targets corresponding to the request received from the terminal of the user,
wherein the estimation code causes the at least one processor to estimate the probability based on the number of changes and the correction information acquired by the correction information acquisition code.

3. The information providing apparatus according to claim 2, wherein
the request received from the terminal of the user includes a number of required spots of the reservation target, and
the program code further comprises determination code configured to cause the at least one processor to determine, according to a difference between the number of available spots of each of the plurality of reservation targets which is cached in the cache and the number of requested spots, the threshold value corresponding to each reservation target.

4. The information providing apparatus according to claim 1, wherein
the request received from the terminal of the user includes a number of requested spots of the reservation target, and
the program code further comprises determination code configured to cause the at least one processor to determine, according to a difference between the number of available spots of each of the plurality of reservation targets which is cached in the cache and the number of requested spots, the threshold value corresponding to each reservation target.

5. The information providing apparatus according to claim 1, wherein the program code further comprises:
number-of-transactions calculation code configured to cause the at least one processor to calculate, based on transaction histories stored in a transaction history storage configured to store transaction histories of reservation targets, a number of transactions of a reservation target per predetermined time for each of a plurality of periods included in a predetermined unit period; and
determination code configured to cause the at least one processor to determine the threshold value according to the number of transactions in a period including a time of receiving the request received from the terminal of the user among the numbers of transactions which are calculated by the number-of-transactions calculation code so that the greater the number of transactions is, the smaller the threshold value is.

6. The information providing apparatus according to claim 1, wherein the program code further comprises:
second providing code configured to cause the at least one processor to provide the information about available spots of a plurality of reservation targets provided in a predetermined period corresponding to the request received from the terminal of the user for each of a plurality of periods included in the predetermined period; and
identification code configured to cause the at least one processor to identify, from among the plurality of periods, a period designated by the user as a browsing period, information related to the reservation targets which are provided in the browsing period being browsed;
wherein, based on designation histories stored in a designation history storage configured to store designation histories of browsing periods, the estimation code causes the at least one processor to estimate a probability, for each of the plurality of periods, that a period is designated next time under a condition in which the period identified by the identification code has been designated, and
the providing code causes the at least one processor to provide the information about the available spots of the plurality of reservation targets for each of the plurality of periods.

7. The information providing apparatus according to claim 1, wherein the program code further comprises:
identification code configured to cause the at least one processor to identify, from among the plurality of reservation targets corresponding to the request received from the terminal of the user, a reservation target designated by the user, information related to the designated reservation target being browsed; and
attribute acquisition code configured to cause the at least one processor to acquire, from an attribute storage configured to store an attribute of each transaction target, an attribute of the reservation target identified by the identification code and an attribute of each of the plurality of reservation targets corresponding to the request received from the terminal of the user;
wherein the estimation code causes the at least one processor to compare the attribute of the reservation target identified by the identification code and the attribute of each of the plurality of reservation targets and estimate the probability based on the comparison result.

8. The information providing apparatus according to claim 1, wherein
the request received from the terminal of the user includes a number of requested spots of the reservation target,
the program code further comprises:
identification code configured to cause the at least one processor to identify a reservation target of which an inquiry about the information about the available spots is requested by the terminal of the user from among the plurality of reservation targets corresponding to the request received from the terminal of the user, and
state-of-available spots acquisition code configured to cause the at least one processor to acquire information about the available spots of the reservation target identified by the identification code from the management apparatus, and
the number of available spots of a reservation target is obtained from the management apparatus in response to the probability being greater than or equal to the threshold value, when the number of available spots of the reservation target identified by the identification code is smaller than the number of requested spots based on the information about the available spots acquired by the state-of-available spots acquisition code.

9. The information providing apparatus according to claim 1, wherein
the request received from the terminal of the user includes a number of requested spots of a reservation target,
the program code further comprises identification code configured to cause the at least one processor to identify a reservation target of which an inquiry about the information about the available spots is requested by the user from among the plurality of reservation targets corresponding to the request received from the terminal of the user, and
the number of available spots of a reservation target where the probability is greater than or equal to the threshold value and information about available spots of the reservation target identified by the identification code are obtained from the management apparatus.

10. The information providing apparatus according to claim 1, wherein the program code further comprises:
request receiving code configured to cause the at least one processor to receive at least one of a reservation request of a reservation target and a cancellation request of a reservation from the terminal of the user; and
update code configured to cause the at least one processor to update the number of available spots cached in the cache based on the reservation request or the cancellation request received by the request receiving code.

11. The information providing apparatus according to claim 1, wherein
the number of available spots of a reservation target where the probability is greater than or equal to the threshold value and a reservation target where the number of available spots cached in the cache is smaller than a second threshold value, among the plurality of reservation targets corresponding to the request received from the terminal of the user, is obtained from the management apparatus.

12. An information providing method performed by an information providing apparatus, the information providing method comprising:
caching, based on a number of available spots of a service which is periodically acquired from a management apparatus that manages numbers of available spots of services, a number of available spots of a reservation target in a cache for each reservation target, wherein the reservation target is identified by a combination of a type of a service and a time of using the service;
estimating, for each of a plurality of reservation targets corresponding to a request received from a terminal of a user, a probability that information related to a reservation target is browsed by the terminal of the user;
in response to the estimated probability being greater than or equal to a threshold value, accessing the management apparatus and transmitting, to the terminal of the user, information about available spots of the reservation target obtained from the management apparatus; and
in response to the estimated probability being smaller than the threshold value, accessing the cache and transmitting, to the terminal of the user, the information about available spots of the reservation target obtained from the cache,
wherein a time to obtain the information about available spots of the reservation target by accessing the cache is reduced compared with a time to obtain the information about available spots of the reservation target by accessing the management apparatus,
wherein the probability that the information related to the reservation target is browsed by the terminal of the user is estimated by statistically processing a history of operations based on acts, by at least one terminal of another user, of browsing the information related to the reservation target.

13. An information providing apparatus comprising:
at least one memory operable to store program code;
at least one processor operable to read the program code and operate as instructed by the program code, the program code including:
control code configured to cause the at least one processor to cache based on a number of available spots of a service which is periodically acquired from a management apparatus that manages numbers of available spots of services a number of available spots of a reservation target in a cache for each reservation target, wherein the reservation target is identified by a combination of a type of a service and a time of using the service;

estimation code configured to cause the at least one processor to estimate, for each of a plurality of reservation targets corresponding to a request received from a terminal of a user a probability that information related to the reservation target is browsed by the terminal of the user;

code configured to cause the at least one processor to, in response to the probability estimated by the estimation code being greater than or equal to a threshold value, access the management apparatus and transmit to the terminal of the user information about available spots of the reservation target obtained from the management apparatus; and code configured to cause the at least one processor to, in response to the probability estimated by the estimation code being smaller than the threshold value access the cache and transmit, to the terminal of the user, the information about available spots of the reservation target obtained from the cache, wherein a time to obtain the information about available spots of the reservation target by accessing the cache is reduced compared with a time to obtain the information about available spots of the reservation target by accessing the management apparatus, and wherein the probability that the information related to the reservation target is browsed by the terminal of the user is estimated by statistically processing a history of operations based on acts, by at least one terminal of another user, of browsing the information related to the reservation target.

* * * * *